US011626129B2

(12) United States Patent
Zhang et al.

(10) Patent No.: US 11,626,129 B2
(45) Date of Patent: *Apr. 11, 2023

(54) PLATING BASED SIDE SHIELD DEFINE AND APPLICATION IN MAGNETIC HEAD

(71) Applicant: SANDISK TECHNOLOGIES LLC, Addison, TX (US)

(72) Inventors: Jinqiu Zhang, Fremont, CA (US); Ming Sun, Pleasanton, CA (US); Feng Liu, San Ramon, CA (US); Xiaojun Zhang, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 16/895,075

(22) Filed: Jun. 8, 2020

(65) Prior Publication Data
US 2020/0302956 A1 Sep. 24, 2020

Related U.S. Application Data

(63) Continuation of application No. 15/978,584, filed on May 14, 2018, now Pat. No. 10,714,125.

(51) Int. Cl.
G11B 5/31 (2006.01)
G11B 5/127 (2006.01)

(52) U.S. Cl.
CPC ............ G11B 5/1278 (2013.01); G11B 5/315 (2013.01); G11B 5/3116 (2013.01); G11B 5/3163 (2013.01)

(58) Field of Classification Search
None
See application file for complete search history.

(56) References Cited

U.S. PATENT DOCUMENTS

| | | | |
|---|---|---|---|
| 5,729,410 A | 3/1998 | Fontana, Jr. et al. | |
| 5,898,547 A | 4/1999 | Fontana, Jr. et al. | |
| 5,898,548 A | 4/1999 | Dill et al. | |
| 7,295,401 B2* | 11/2007 | Jayasekara | G11B 5/1278 |
| 8,035,930 B2 | 10/2011 | Takano et al. | |
| 8,295,008 B1* | 10/2012 | Sasaki | G11B 5/315 |
| | | | 360/125.3 |
| 8,477,452 B2* | 7/2013 | Sasaki | G11B 5/1278 |
| | | | 360/125.27 |

(Continued)

OTHER PUBLICATIONS

USPTO Office Communication, Notice of Allowance and Fee(s) Due, and Notice of References Cited for U.S. Appl. No. 15/978,660, dated Jun. 26, 2019, 8 pages.

(Continued)

Primary Examiner — William J Klimowicz
(74) Attorney, Agent, or Firm — The Marbury Law Group PLLC

(57) ABSTRACT

A magnetic recording head having air bearing surface (ABS) includes a main pole, a side shield laterally spaced from the main pole by a first side gap and a second side gap, an electrically conductive non-magnetic gap material layer disposed between the main pole and the side shield in the first side gap, and a dielectric non-magnetic gap material matrix and a conformal dielectric spacer layer disposed between the main pole and the side shield in the second side gap.

4 Claims, 21 Drawing Sheets

(56) References Cited

U.S. PATENT DOCUMENTS

| | | | |
|---|---|---|---|
| 8,493,687 B2* | 7/2013 | Sasaki | G11B 5/3116 360/125.13 |
| 8,533,937 B1 | 9/2013 | Wang et al. | |
| 8,576,517 B1* | 11/2013 | Tran | G11B 5/3116 360/125.03 |
| 8,749,919 B2* | 6/2014 | Sasaki | G11B 5/3116 360/125.27 |
| 8,767,347 B1* | 7/2014 | Sasaki | G11B 5/315 360/123.06 |
| 8,792,208 B1 | 7/2014 | Liu et al. | |
| 8,848,316 B2 | 9/2014 | Kief et al. | |
| 8,995,089 B2 | 3/2015 | Takizawa et al. | |
| 9,111,550 B1 | 8/2015 | Liu et al. | |
| 9,251,812 B2* | 2/2016 | Sasaki | G11B 5/3116 |
| 9,286,919 B1* | 3/2016 | Liu | G11B 5/23 |
| 9,396,741 B1 | 7/2016 | Tian et al. | |
| 9,412,398 B2 | 8/2016 | Allen et al. | |
| 9,558,763 B1 | 1/2017 | Luo et al. | |
| 9,711,168 B1* | 7/2017 | Yang | G11B 5/112 |
| 9,779,765 B1 | 10/2017 | Liu et al. | |
| 10,460,750 B1 | 10/2019 | Zhang et al. | |
| 10,714,129 B1* | 7/2020 | Tang | G11B 5/115 |
| 2008/0088972 A1* | 4/2008 | Sasaki | G11B 5/3163 360/110 |
| 2010/0162556 A1* | 7/2010 | Guruz | G11B 5/455 29/603.16 |
| 2011/0134567 A1 | 6/2011 | Chen et al. | |
| 2013/0242431 A1* | 9/2013 | Hosomi | G11B 5/235 216/22 |
| 2015/0380016 A1* | 12/2015 | Sasaki | G11B 5/3163 216/22 |
| 2016/0055869 A1* | 2/2016 | Sasaki | G11B 5/3116 29/603.18 |
| 2019/0348068 A1 | 10/2019 | Zhang et al. | |

OTHER PUBLICATIONS

USPTO Office Communication, Non-Final Office Action for U.S. Appl. No. 15/978,660, dated Mar. 22, 2019, 7 pages.

* cited by examiner

ABS View

Top View

ABS View

Top View

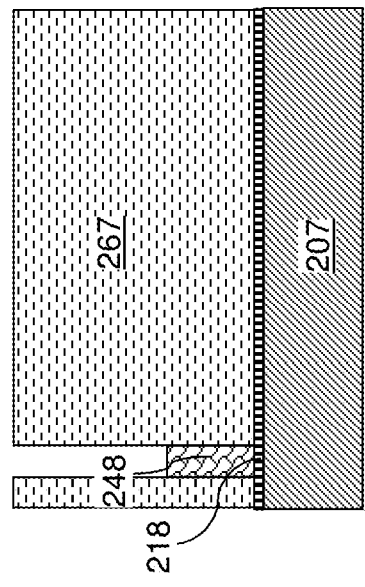
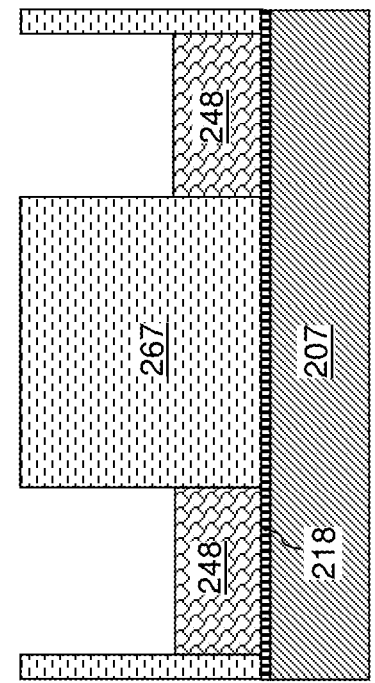
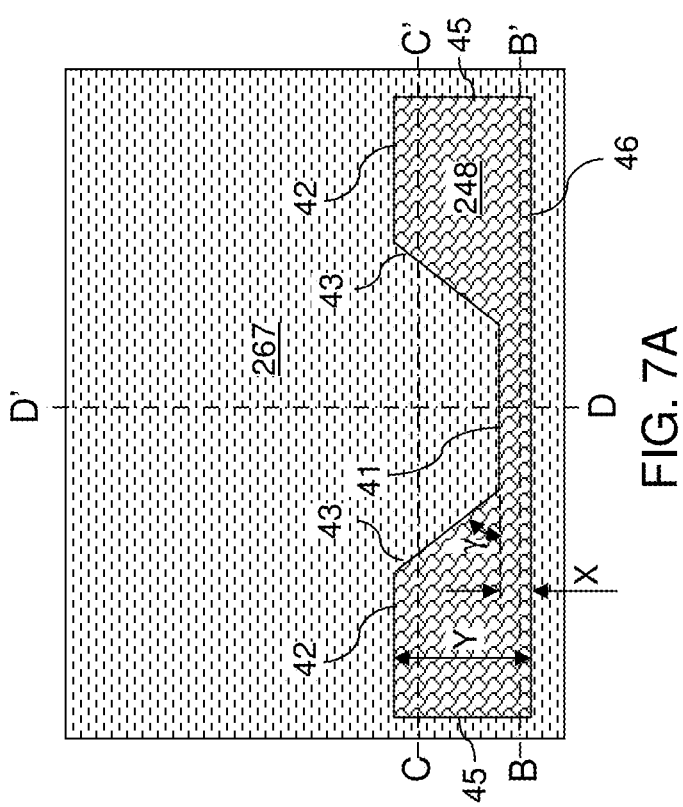
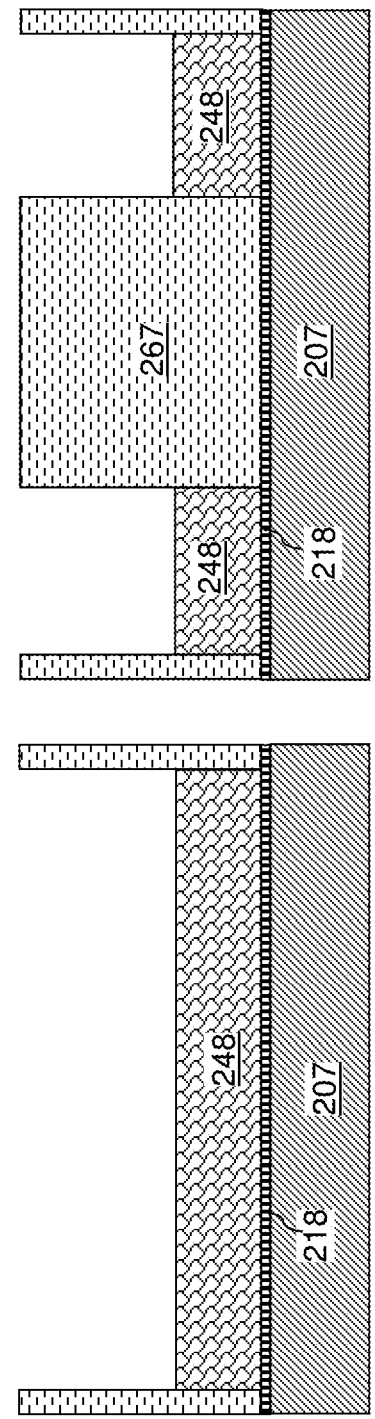
FIG. 7A
FIG. 7B
FIG. 7C
FIG. 7D

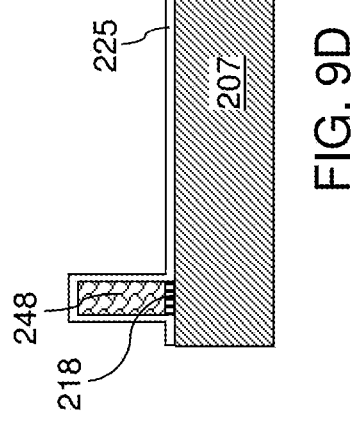
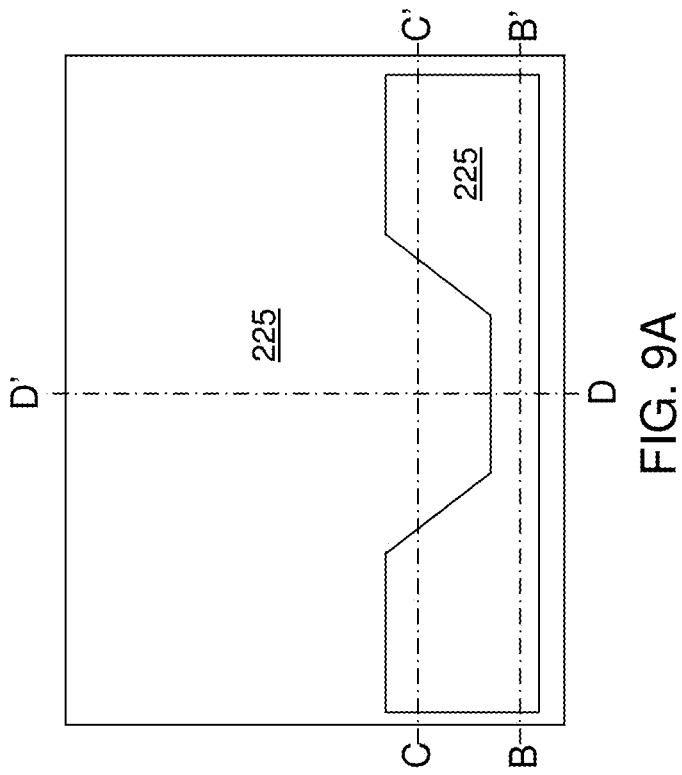
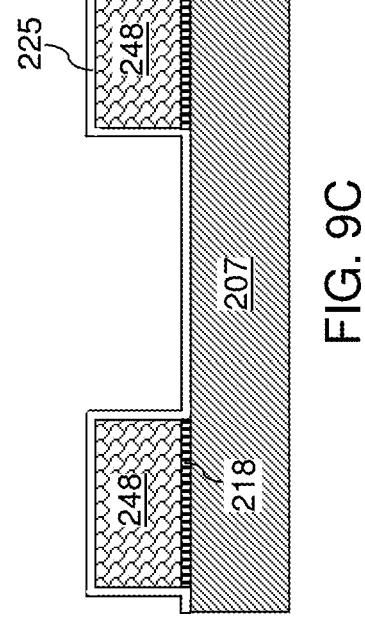
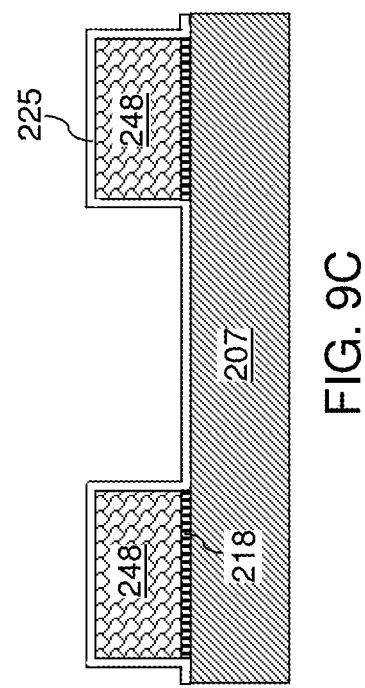

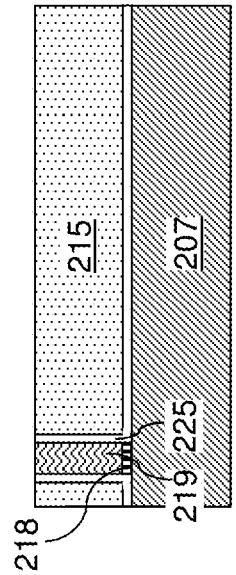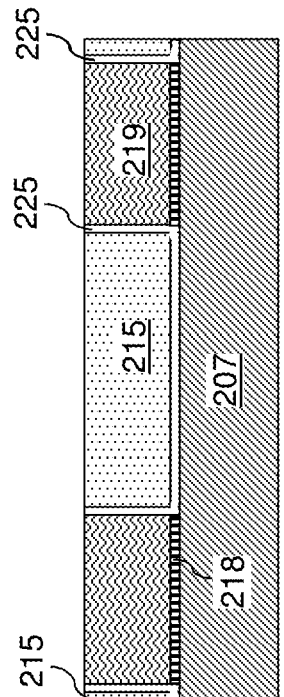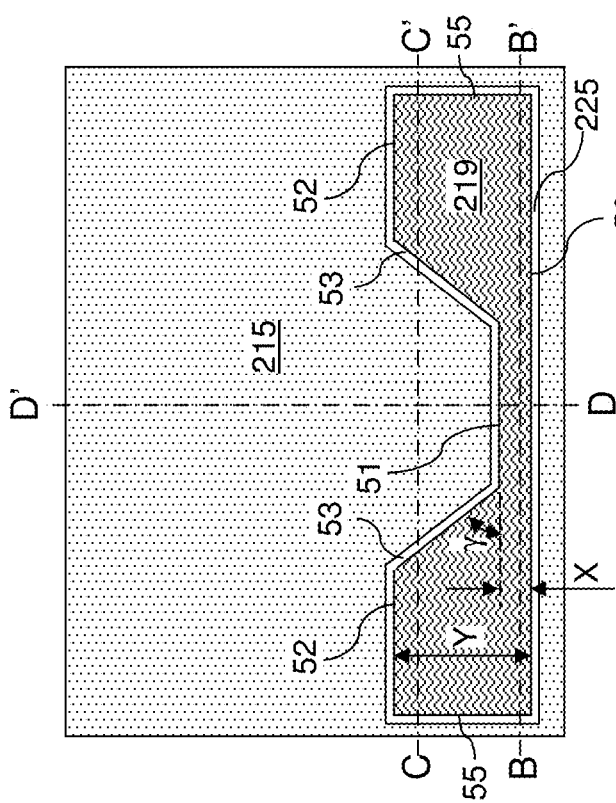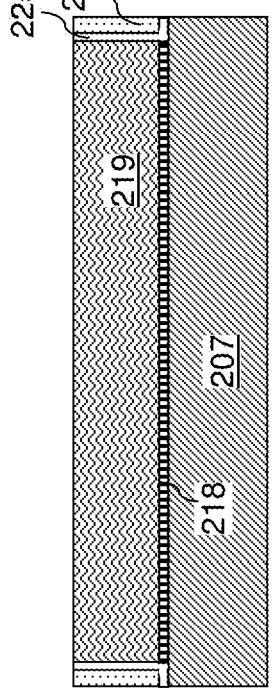

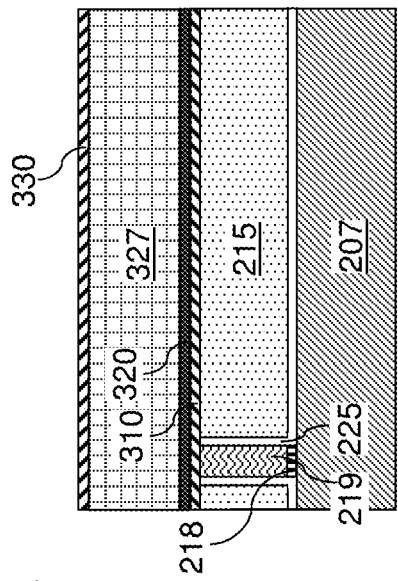
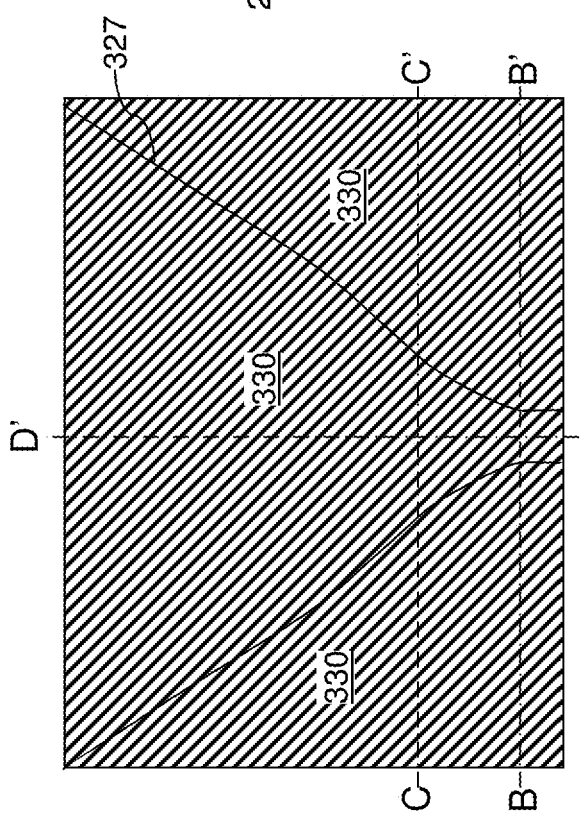
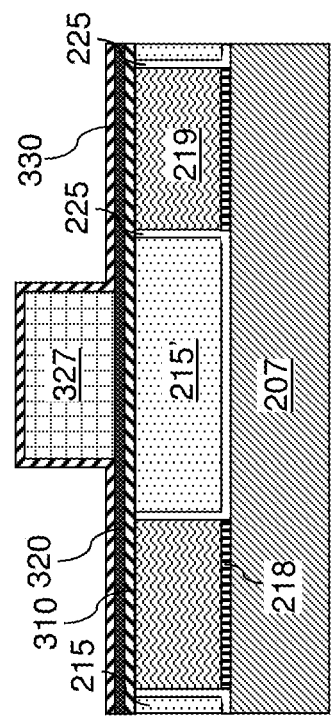
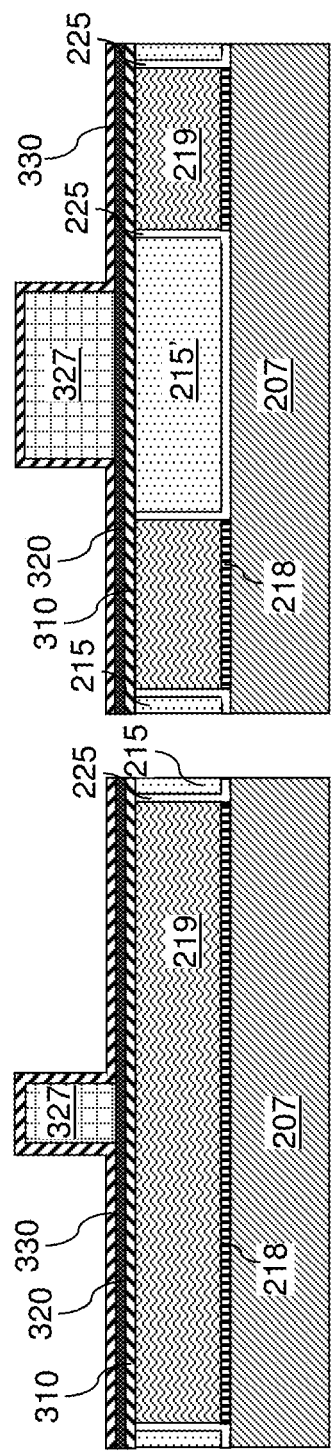
FIG. 15A
FIG. 15B
FIG. 15C
FIG. 15D

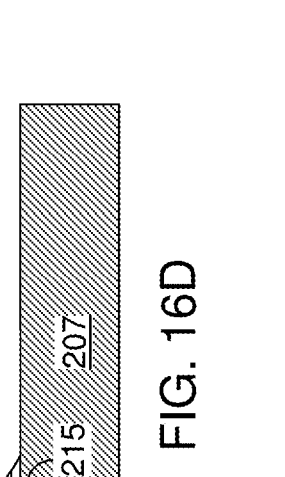
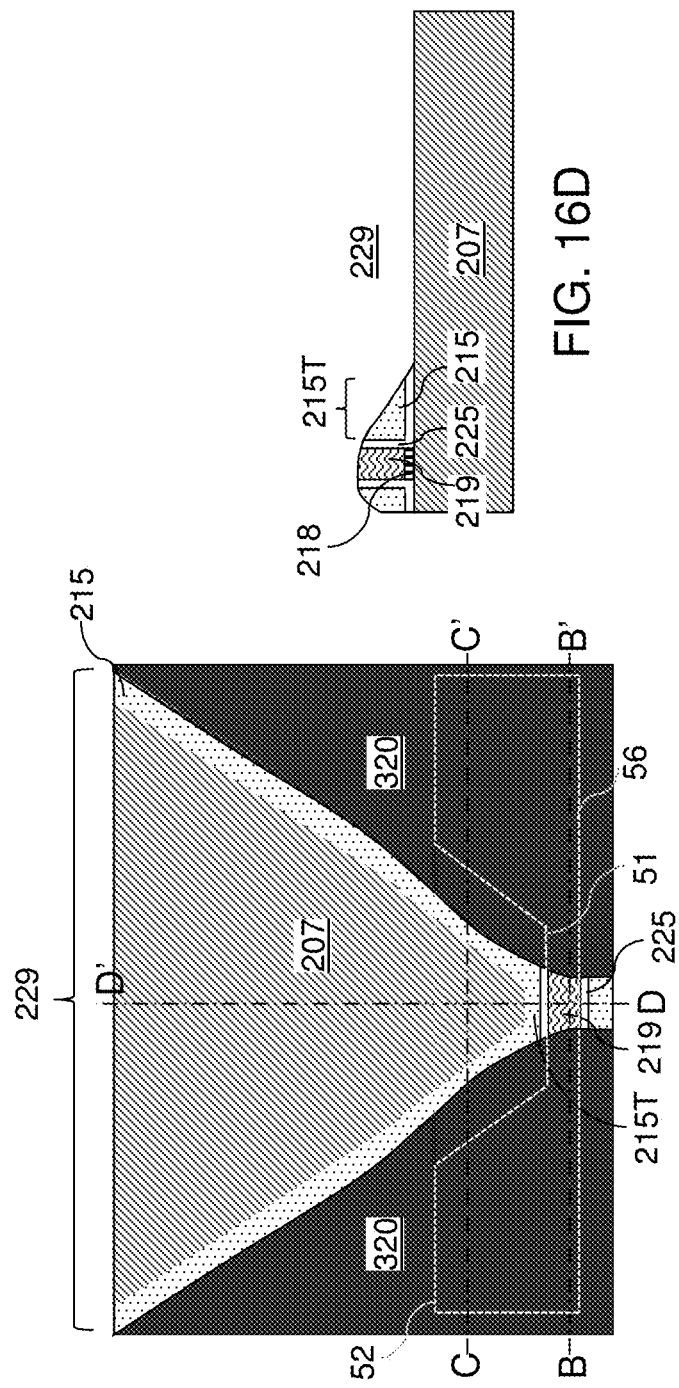
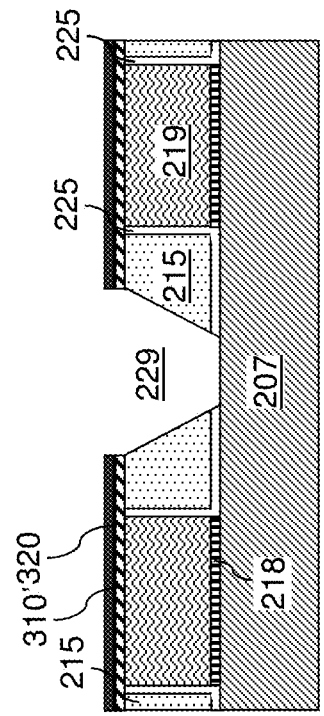
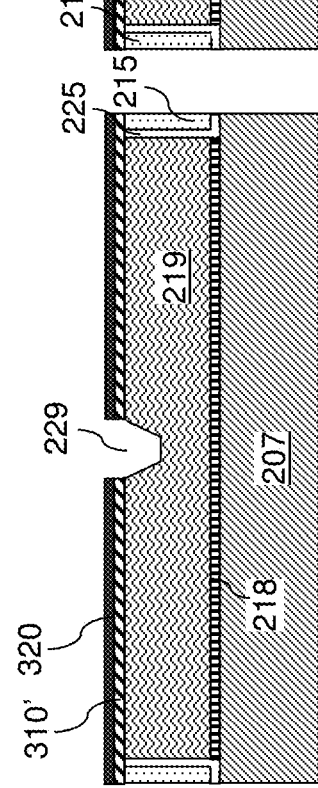

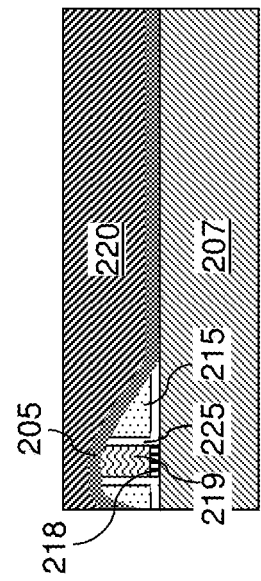
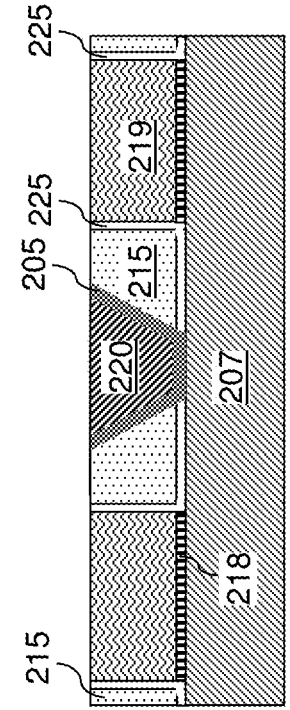
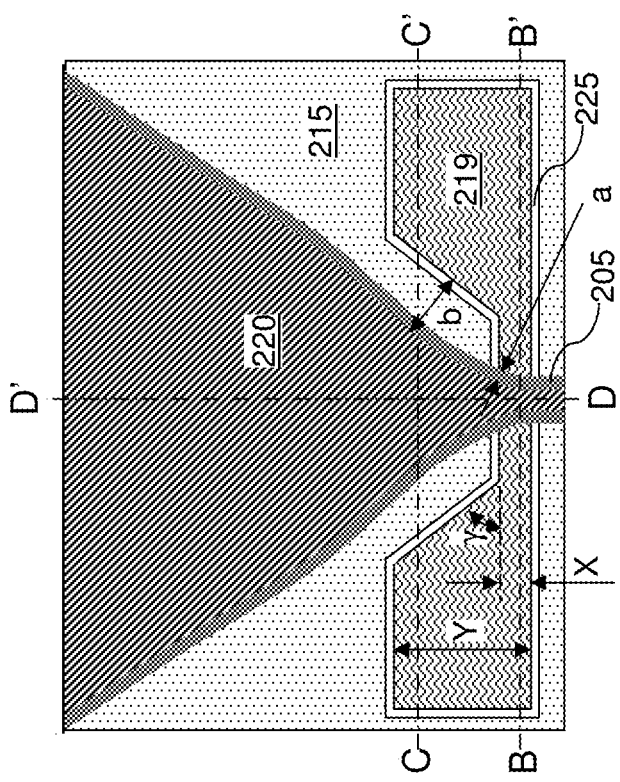
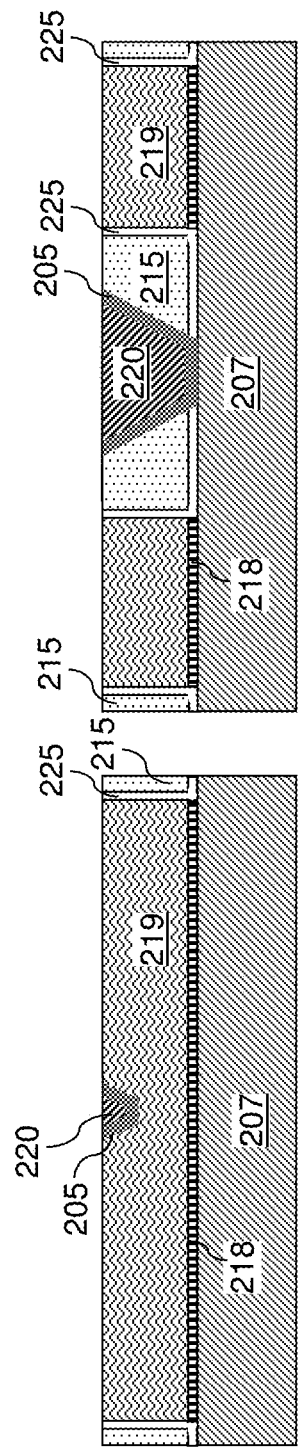
FIG. 18A
FIG. 18B
FIG. 18C
FIG. 18D

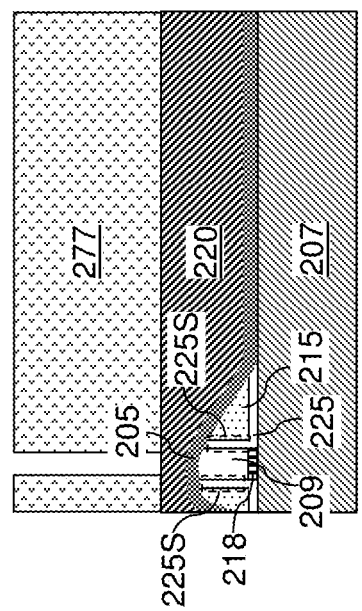
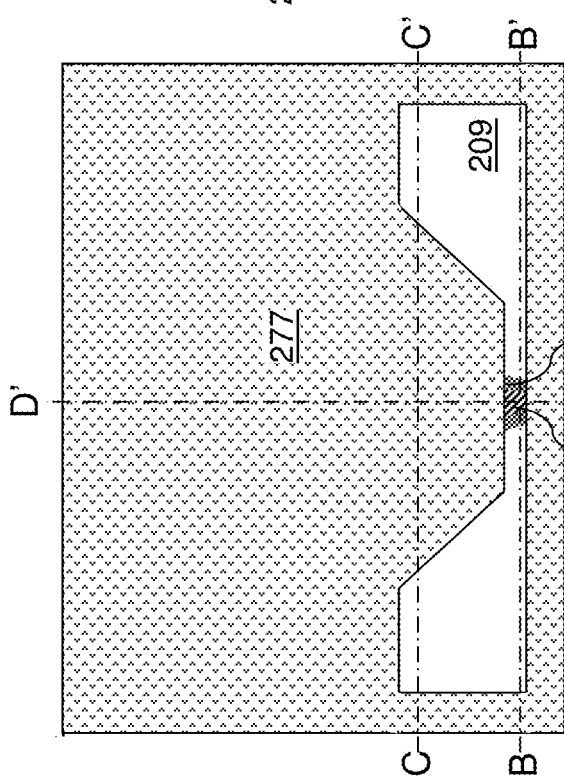
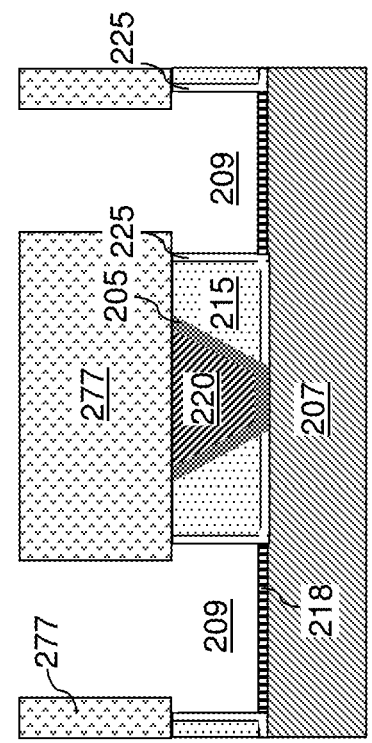
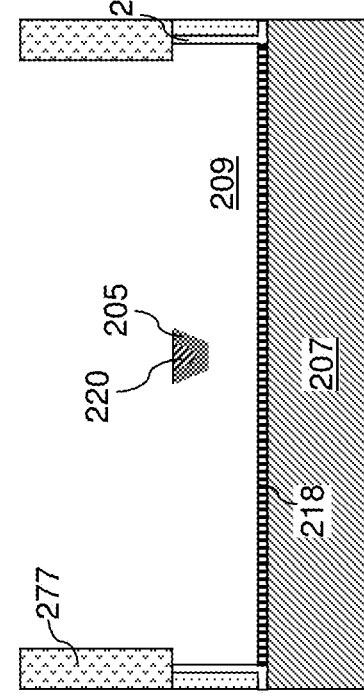

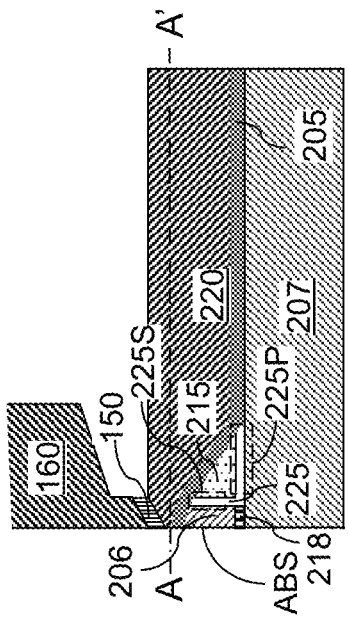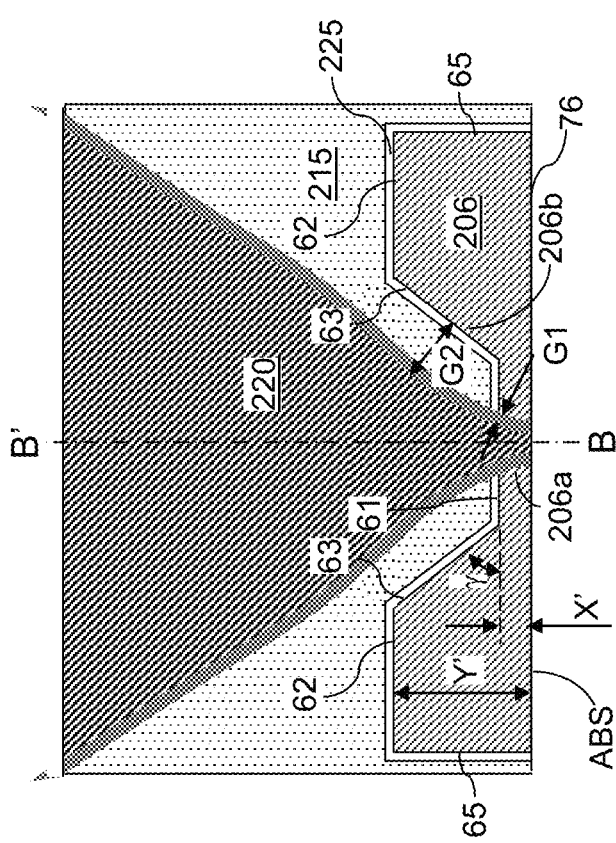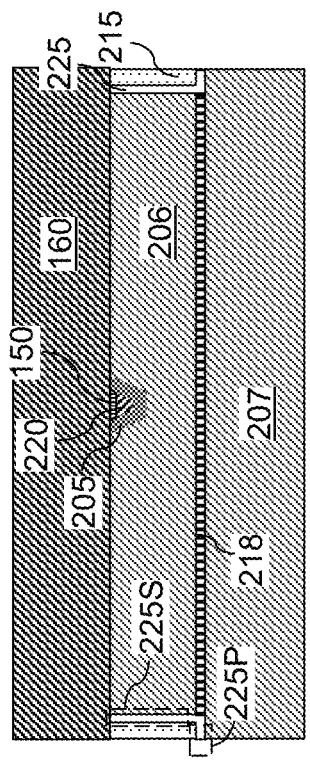
FIG. 23B
FIG. 23A
FIG. 23C

PLATING BASED SIDE SHIELD DEFINE AND APPLICATION IN MAGNETIC HEAD

FIELD

The present disclosure relates generally to the field of magnetic transducers, and particularly to a magnetic head having a dual gap configuration and methods of manufacturing the same.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIGS. 1 and 2 depict air-bearing surface ("ABS") and top views, respectively, of a portion of a conventional perpendicular magnetic recording ("PMR") transducer 10. The conventional transducer 10 includes an intermediate layer 12. The intermediate layer 12 is the layer on which the pole is formed. The intermediate layer 12 may be a leading edge shield or a nonmagnetic layer. A gap layer 20 that may separate the pole 30 from the underlying intermediate layer 12 is shown. The conventional pole 30 and side shield 40 are also shown. For clarity, seed layer(s) are not separately depicted.

The side shields 40 are conformal to the pole 30. Thus, the thickness of the gap layer 20, t, does not vary in the down track direction. Similarly, the thickness of the gap layer 20 does not vary in a direction perpendicular to the ABS until the side shields 40 terminate at the throat height. Stated differently, the walls of the side shields 40 closest to the sidewalls of the pole 30 are substantially the same distance and have substantially the same profile as the pole 30.

Although the conventional transducer 10 may be used to write to media, there may be drawbacks at higher recording densities. At higher recording densities, the components 12, 20, 30 and 40 of the conventional transducer 10 are scaled to smaller sizes. As a result, the write field of the conventional pole 30 may be significantly reduced. In addition, the reverse overwrite loss may be increased. These developments are undesirable. Although these issues may be partially addressed by removal of the side shields 40, this is also undesirable. The side shields 40 are desired to prevent adjacent track interference and to mitigate wide track erasure that may be associated with a smaller side shield throat height.

SUMMARY

According to an aspect of the present disclosure, a magnetic recording head having air bearing surface (ABS) includes a main pole, a side shield laterally spaced from the main pole by a first side gap and a second side gap, an electrically conductive non-magnetic gap material layer disposed between the main pole and the side shield in the first side gap, and a dielectric non-magnetic gap material matrix and a conformal dielectric spacer layer disposed between the main pole and the side shield in the second side gap.

According to another aspect of the present disclosure, a magnetic recording head having air bearing surface (ABS) includes a main pole, and a side shield laterally spaced from the main pole by a first side gap and a second side gap. A first portion of the side shield is located between a second portion of the side shield and the ABS, a straight first throat height sidewall of the side shield is parallel to the ABS and is laterally offset from the ABS by a first throat height, the first throat height sidewall is located between the first and the second portions of the side shield, and a pair of second throat height sidewalls of the side shield are parallel to the ABS and are laterally offset from the ABS by a second throat height which is greater than the first throat height.

According to another embodiment, a method of manufacturing a magnetic recording head includes forming a side shield template structure, forming a main pole recess region in side shield template structure, forming a non-magnetic gap material layer in the main pole recess region, forming a main pole over the non-magnetic gap material layer, and replacing the side shield template structure with a side shield.

BRIEF DESCRIPTION OF THE DRAWINGS

FIG. 7A is a top-down view of an exemplary structure after formation of a sacrificial mold structure according to an embodiment of the present disclosure. FIGS. 7B, 7C, and 7D are vertical cross-sectional views of the exemplary structure along the vertical planes B-B', C-C', and D-D' of FIG. 7A, respectively.

FIG. 9A is a top-down view of an exemplary structure after formation of a conformal dielectric spacer layer according to an embodiment of the present disclosure. FIGS. 9B, 9C, and 9D are vertical cross-sectional views of the exemplary structure along the vertical planes B-B', C-C', and D-D' of FIG. 9A, respectively.

FIG. 14A is a top-down view of an exemplary structure after formation of a side shield template structure by planarization of the template material layer according to an embodiment of the present disclosure. FIGS. 14B, 14C, and 14D are vertical cross-sectional views of the exemplary structure along the vertical planes B-B', C-C', and D-D' of FIG. 14A, respectively.

FIG. 15A is a top-down view of an exemplary structure after formation of a blanket metal layer, a metallic etch mask layer, a patterned photoresist layer, and a sacrificial metal layer according to an embodiment of the present disclosure. FIGS. 15B, 15C, and 15D are vertical cross-sectional views of the exemplary structure along the vertical planes B-B', C-C', and D-D' of FIG. 15A, respectively.

FIG. 16A is a top-down view of an exemplary structure after formation of a main pole recess region according to an embodiment of the present disclosure. FIGS. 16B, 16C, and 16D are vertical cross-sectional views of the exemplary structure along the vertical planes B-B', C-C', and D-D' of FIG. 16A, respectively.

FIG. 18A is a top-down view of an exemplary structure after formation of a main pole by planarization of the non-magnetic gap material layer and the main pole material layer according to an embodiment of the present disclosure. FIGS. 18B, 18C, and 18D are vertical cross-sectional views of the exemplary structure along the vertical planes B-B', C-C', and D-D' of FIG. 18A, respectively.

FIG. 20A is a top-down view of an exemplary structure after formation of a side shield cavity according to an embodiment of the present disclosure. FIGS. 20B, 20C, and 20D are vertical cross-sectional views of the exemplary structure along the vertical planes B-B', C-C', and D-D' of FIG. 20A, respectively.

FIG. 23A is horizontal cross-sectional view of an exemplary structure after formation of an air bearing surface according to an embodiment of the present disclosure.

FIG. 23B is a vertical cross-sectional view of the exemplary structure along the vertical plane B-B' of FIG. 23A.

FIG. 23C is an air bearing surface (ABS) view of the exemplary structure of FIGS. 23A and 23B.

DETAILED DESCRIPTION

Figure 1:
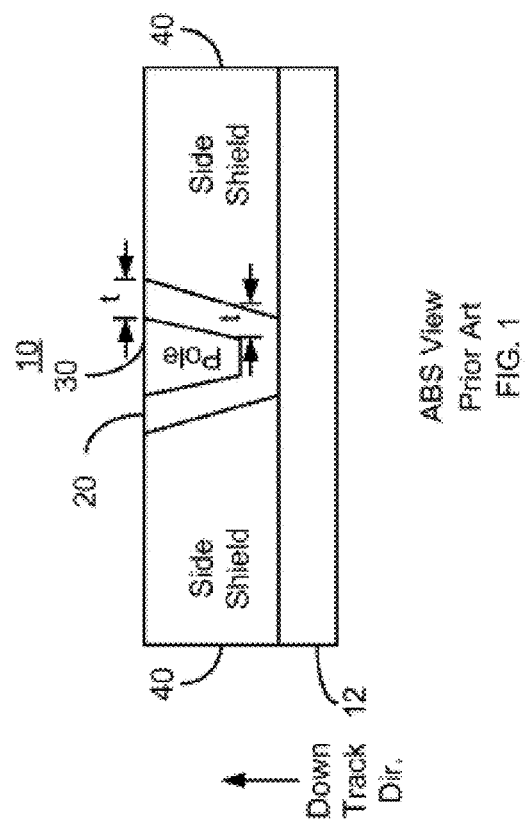
FIG. 1 depicts an ABS view of a conventional magnetic transducer.
Figure 2:
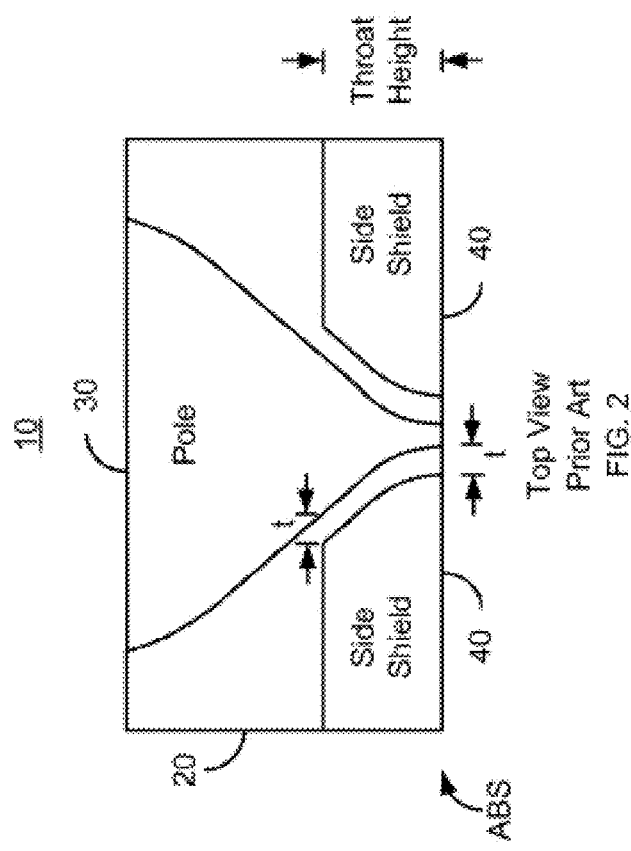
FIG. 2 depicts a top view of a conventional magnetic transducer.
Figure 3:
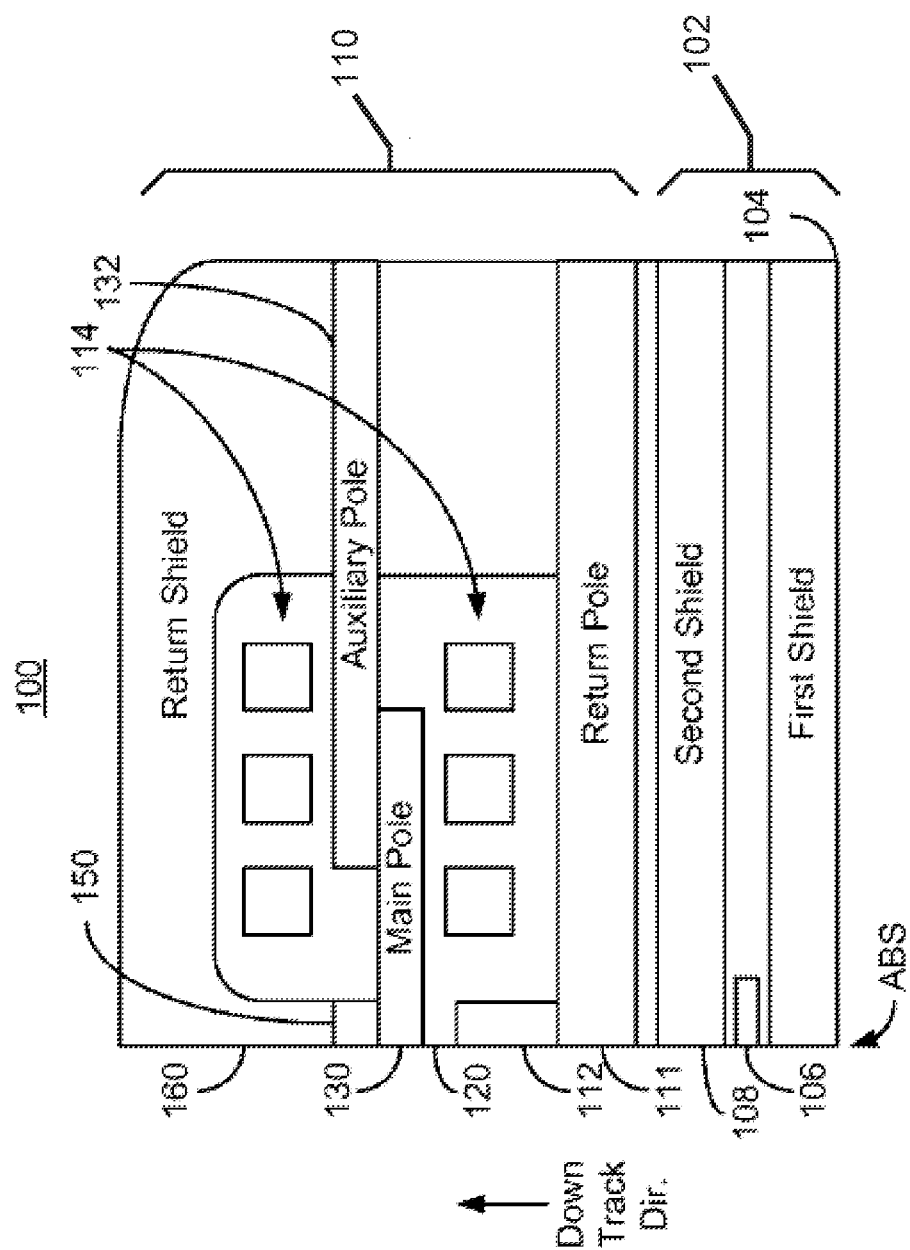
FIG. 3 depicts a side view of a magnetic head.
Figure 4:
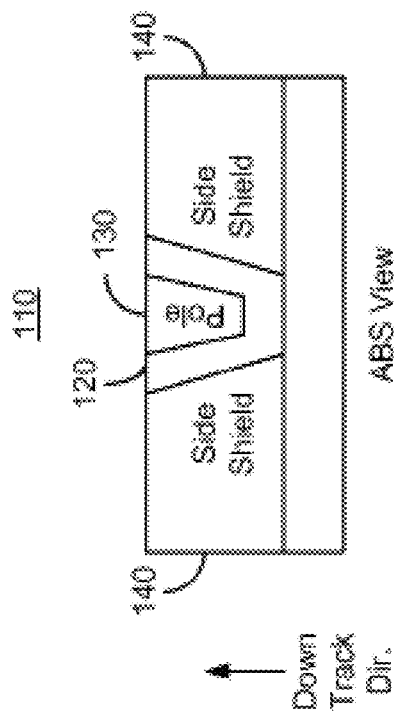
FIG. 4 depicts an ABS view and FIG. 5 depicts a top view of a magnetic transducer described in U.S. Pat. No. 8,792,208.
Figure 5:
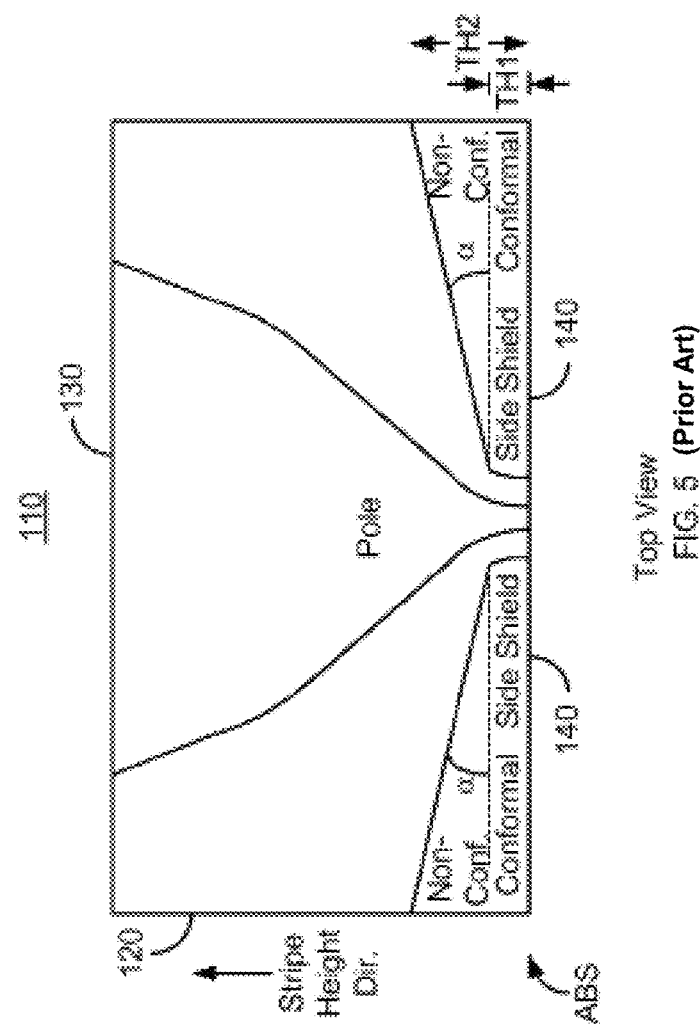

U.S. Pat. No. 8,792,208 discloses a non-conformal side shield design, in which the side shield is characterized by a finite taper angle α that provides a non-conformal region of the side gap. FIGS. 3-5 depict various views of a portion of a magnetic head 100 of U.S. Pat. No. 8,792,208, which is incorporated herein by reference in its entirety.

FIG. 3 depicts a side view of the magnetic head 100 including a read transducer (also referred to as a read head) 102 and a write transducer (also referred to as a recording head or writing head) 110. FIGS. 4-5 depict ABS and plan (top) views of the write transducer 110. For clarity, FIGS. 3-5 are not to scale. Although shown as part of a merged magnetic head, in other embodiments, the write transducer 110 may be part of a stand-alone writing head. The magnetic head 100 containing the read transducer 102 and write transducer 110 is part is part of a disk drive having a media and a slider to which the head 100 is attached. Further, only a portion of the components of the read transducer 102 and write transducer 110 are depicted.

The read transducer 102 includes soft magnetic shields 104 and 108 and a read sensor 106. The sensor 106 may be a giant magnetoresistive or tunneling magnetoresistive sensor. Although the second shield 108 of the read transducer 102 is shown as separate from the return pole 111, in some embodiments, these structures are merged.

The write transducer 110 includes optional return pole 111, main pole 130, optional leading edge shield 112, gap (i.e., side gap) 120, coils 114, auxiliary pole 132, write gap 150 and return shield 160. As can be seen in FIG. 4, the main pole 130 has sidewalls having a reverse angle. As a result, the top of the main pole 130 is wider than its bottom. In addition, as can be seen in FIG. 5, the nose of the pole 130 diverges from the ABS at some angle, termed the writer nose chisel angle. The value of the writer nose chisel angle may vary between designs. Further, the sidewalls of the pole 130 are curved in the stripe height direction perpendicular to the ABS. The pole 130 includes magnetic material(s) and may be a multilayer and/or an alloy. The side gap 120 is non-magnetic and separates the pole 130 from at least the side shields 140. The side gap 120 may, for example, have a width of 40-120 nanometers. In the embodiment shown, a portion of the side gap 120 resides below the main pole 130.

The side shields 140 include a high permeability soft magnetic material, such as NiFe. In some embodiments, the side shields 140 may be an alloy and/or a multilayer. The side shields 140 are conformal to the main pole 130 in the down track direction. Thus, in the embodiment shown, the thickness of the side gap 120 is substantially constant for any plane parallel to the ABS. However, in other embodiments, the side shields 140 may not be conformal with the pole in the down track direction. For example, the side gap 120 may be thinner at the leading edge than at the trailing edge. Alternatively, the side gap 120 may be thicker at the leading edge than at the trailing edge. Although shown only as side shields 140, in other embodiments, the shields 140 may form a wraparound shield ("WAS"). Although not shown, a portion of the side shield(s) 140 that is not shown may extend in a direction perpendicular to the stripe height and down track directions.

Each of the side shields 140 of U.S. Pat. No. 8,792,208 includes at least one nonconformal portion. The transducer shown in FIGS. 4-5 includes a single nonconformal portion that extends from a first throat height TH1 to a second throat height TH2 in the stripe height direction. Thus, the spacing between the nonconformal portion of the side shields 140 and the main pole 130 varies based on distance from the ABS. In the device shown in FIGS. 3-5, the spacing between the main pole 130 and the side shields 140 increases monotonically with distance from the ABS in the nonconformal region. However, other variations in the spacing between the pole 130 and the side shields 140 are possible. In some embodiments, the thickness of the side shields 140 is TH2. The nonconformal portion of the shields 140 has a takeoff angle, α, from a plane parallel to the ABS. The takeoff angle may be is at least fifteen degrees and not more than thirty degrees. Alternatively, the takeoff angle may have another value. The takeoff angle can be significantly smaller than the nose chisel angle, resulting in the side shields 140 rapidly diverging from the main pole 130. The second throat height, which may also be the side shield depth, may be at least one hundred nanometers. In some embodiments, the second throat height is at least two hundred fifty and not more than five hundred nanometers. The first throat height is at least thirty nanometers. The first throat height may be at least sixty nanometers and not more than one hundred fifty nanometers. Alternatively, the first throat height is not more than sixty nanometers.

The side shields 140 of FIGS. 4 and 5 also have a conformal portion that extends from the ABS to the first throat height TH1. The conformal portion resides between the nonconformal portion of the side shields 140 and the ABS. Although only one nonconformal portion and one conformal portion is shown for each shield, one or more nonconformal portions and/or one or more conformal portions may be included in the side shields 140. Each nonconformal portion may adjoin another nonconformal portion having a different takeoff angle and/or may adjoin a conformal portion.

Because the side shields 140 are present in the transducer of FIGS. 4 and 5, adjacent track interference ("ATI") and wide area track erasure ("WATER") may be mitigated by the non-conformal side gap illustrated in FIGS. 4 and 5. However, a further improvement in the WATER reliability is desirable.

One embodiment of the present disclosure provides a dual side gap configuration that improves WATER reliability, reduces loss of write field and enhances writability for a perpendicular magnetic recording ("PMR") write head. The embodiment dual side gap configuration will be described in more detail below with respect to FIGS. 23A-23C.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exist a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

As used herein, an "electrically conductive material" refers to a material having electrical conductivity greater than $1.0 \times 10^5$ S/cm. As used herein, a "metallic material" refers to a conductive material including at least one metallic element therein. As used herein, an "electrically insulating material" or a "dielectric material" refers to a material having electrical conductivity less than $1.0 \times 10^{-6}$ S/cm. As used herein, a soft magnetic material refers to a material having intrinsic coercivity less than 1000 A/m. All measurements for electrical conductivities are made at the standard condition.

Figure 6D:
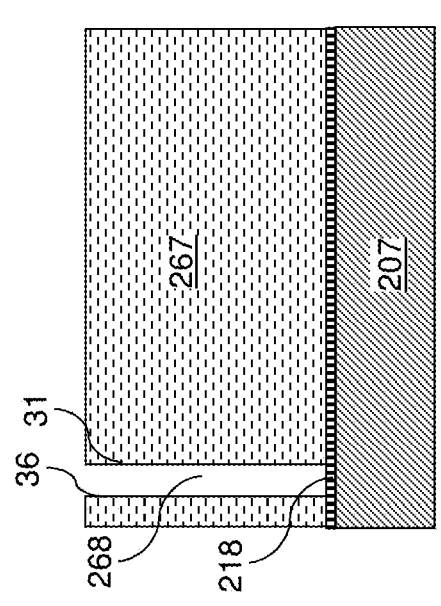
FIGS. 6B, 6C, and 6D are vertical cross-sectional views of the exemplary structure along the vertical planes B-B', C-C', and D-D' of FIG. 6A, respectively.
Figure 6C:
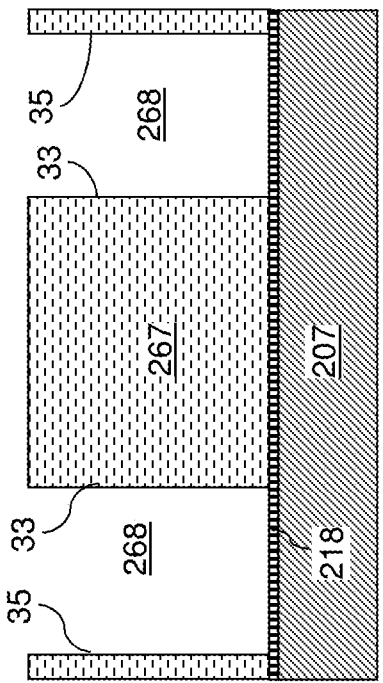
Figure 6A:
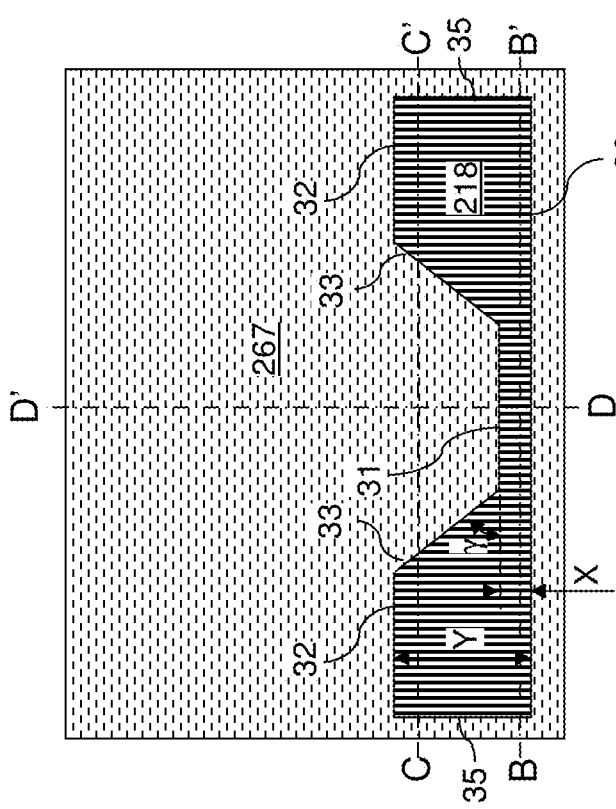
FIG. 6A is a top-down view of an exemplary structure including an in-process recording head after formation of a seed layer on a leading-edge plate and formation of a patterned photoresist layer according to an embodiment of the present disclosure.
Figure 6B:
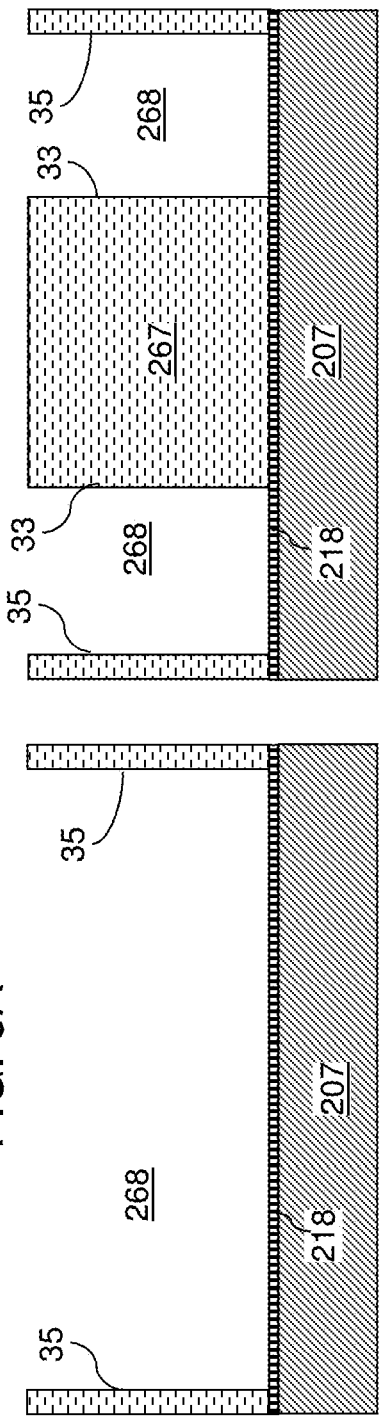
Figure 8D:
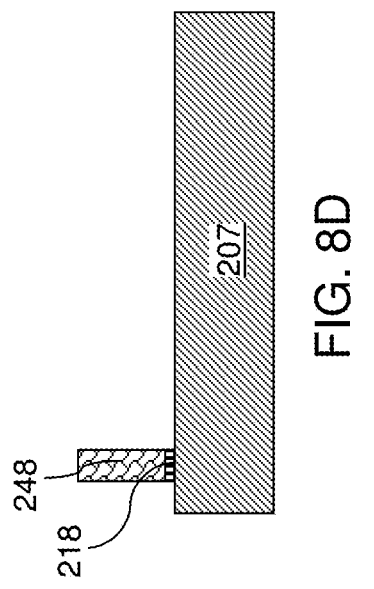
FIGS. 8B, 8C, and 8D are vertical cross-sectional views of the exemplary structure along the vertical planes B-B', C-C', and D-D' of FIG. 8A, respectively.
Figure 8C:
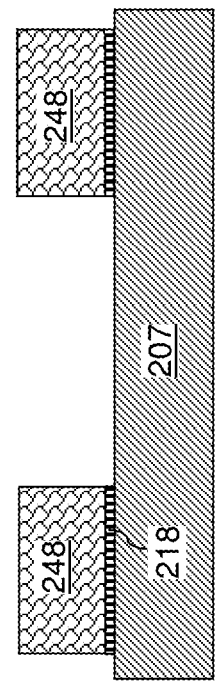
Figure 8A:
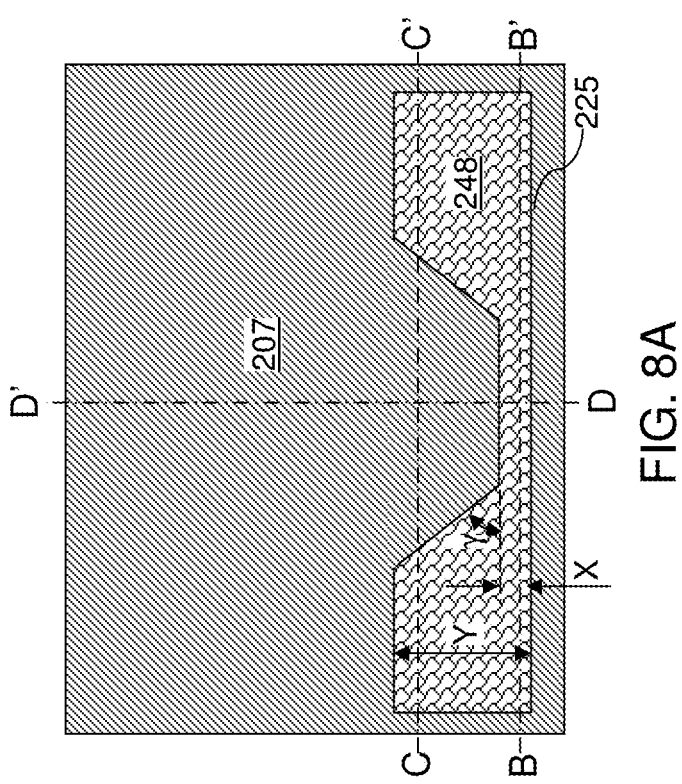
FIG. 8A is a top-down view of an exemplary structure after removal of the patterned photoresist layer according to an embodiment of the present disclosure.
Figure 8B:
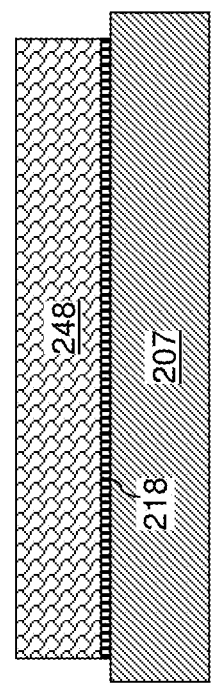
Figure 10A:
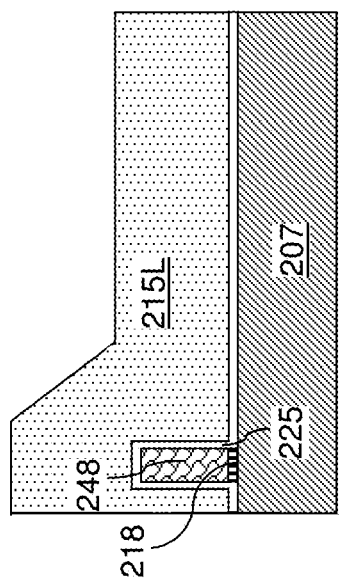
FIG. 10A is a top-down view of an exemplary structure after deposition of a non-magnetic gap material over the conformal dielectric spacer layer according to an embodiment of the present disclosure.
Figure 10D:
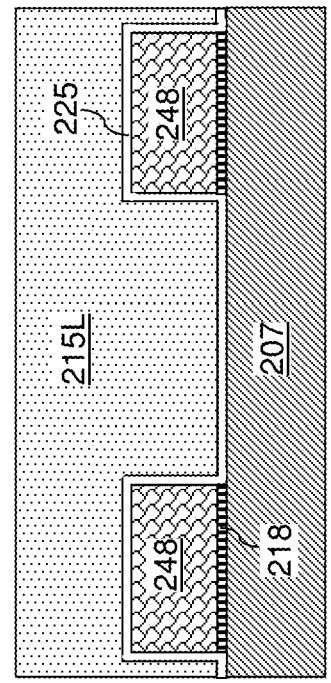
FIGS. 10B, 10C, and 10D are vertical cross-sectional views of the exemplary structure along the vertical planes B-B', C-C', and D-D' of FIG. 10A, respectively.
Figure 10B:
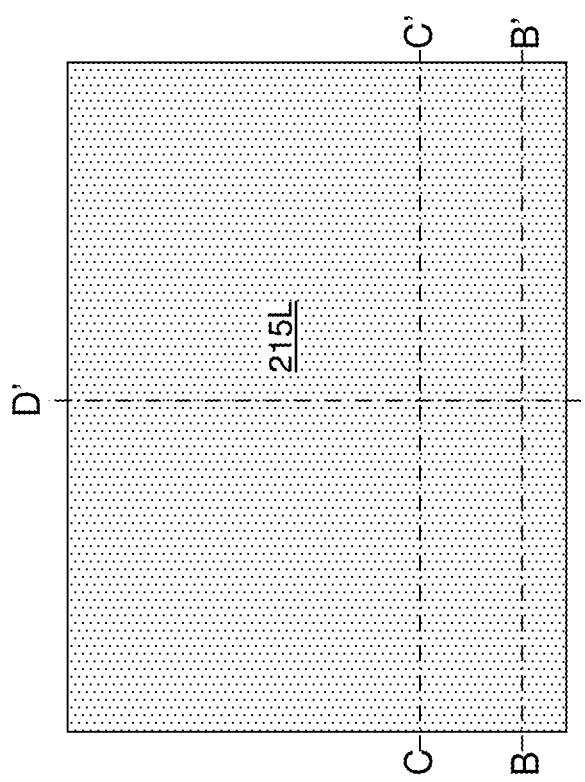
Figure 10C:
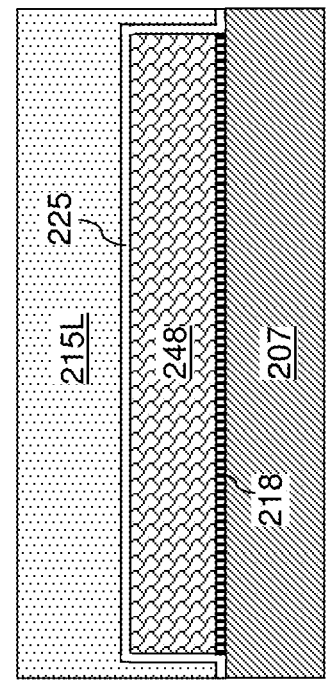
Figure 11A:
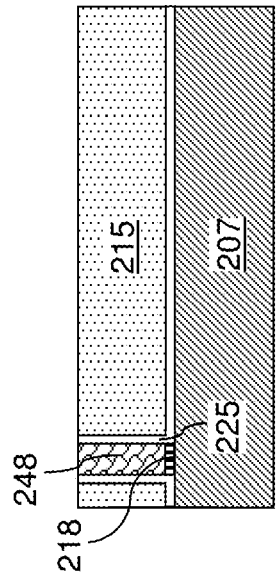
FIG. 11A is a top-down view of an exemplary structure after planarizing the non-magnetic gap material according to an embodiment of the present disclosure.
Figure 11B:
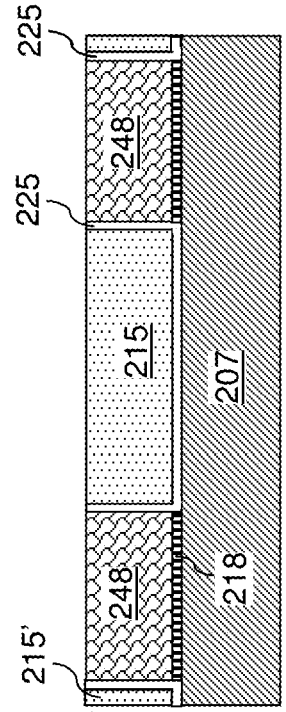
FIGS. 11B, 11C, and 11D are vertical cross-sectional views of the exemplary structure along the vertical planes B-B', C-C', and D-D' of FIG. 11A, respectively.
Figure 11C:
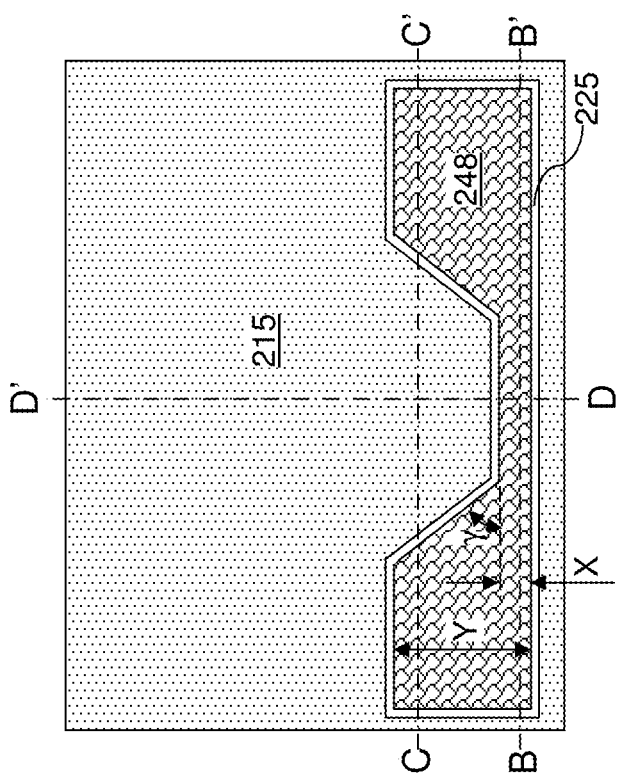
Figure 11D:
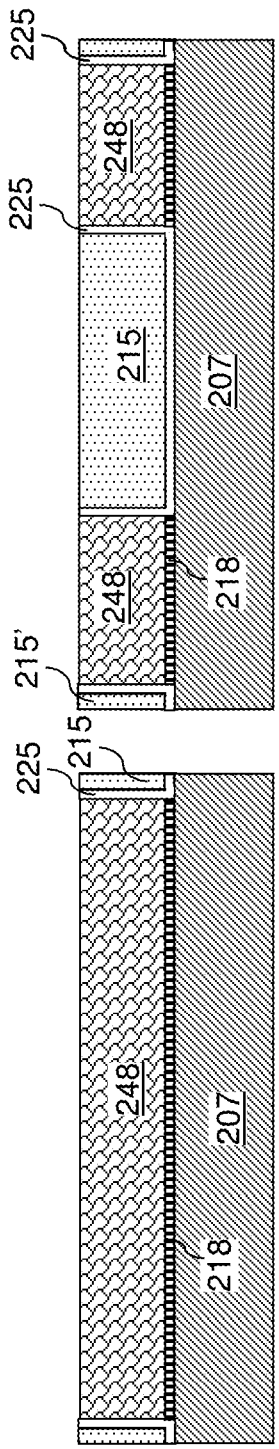
Figure 12D:
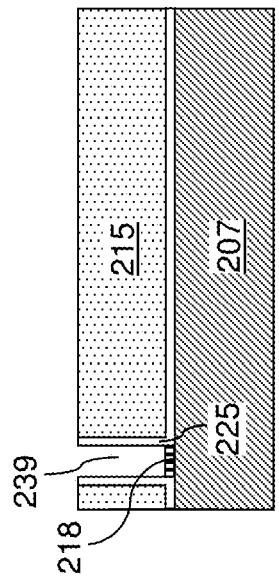
FIGS. 12B, 12C, and 12D are vertical cross-sectional views of the exemplary structure along the vertical planes B-B', C-C', and D-D' of FIG. 12A, respectively.
Figure 12C:
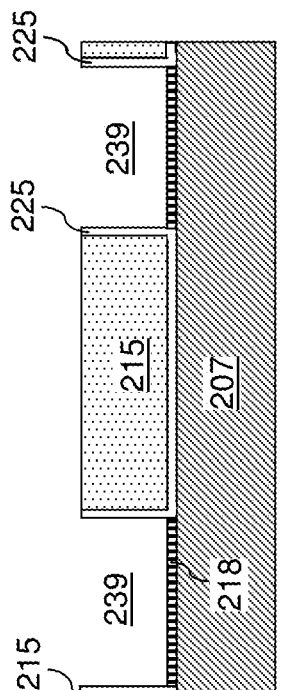
Figure 12A:
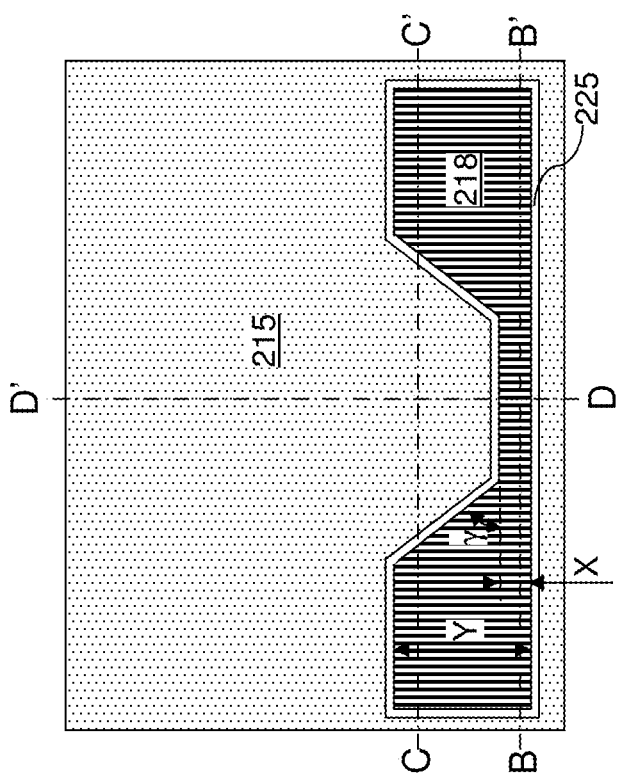
FIG. 12A is a top-down view of an exemplary structure after removal of the sacrificial mold structure according to an embodiment of the present disclosure.
Figure 12B:
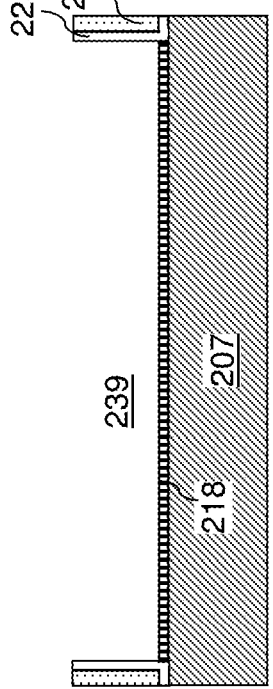

Referring to FIGS. 6A-6D, an in-process exemplary structure is illustrated, which can be employed to form a write transducer (i.e., recording head) of a magnetic head, such as the magnetic head 100 illustrated in FIG. 3. An "in-process" structure refers to a structure during a manufacturing step that is subsequently modified. FIG. 6A illustrates a top view of the structures, FIG. 6B illustrates the ABS view (i.e., a view along a cross-sectional plane B-B' in FIG. 6A that will subsequently become the ABS), FIG. 6C illustrates a yoke region cross-sectional view along plane C-C' in FIG. 6A and FIG. 6D illustrates an apex view along plane D-D' in FIG. 6A.

A leading-edge plate 207 is formed over a substrate. The substrate may include additional structures below the leading-edge plate 207 that can be employed to form various components of a reading head 102, an optional auxiliary pole 132, a portion of the magnetic coil 113, and any intervening materials. The leading-edge plate 207 includes a soft magnetic material. Exemplary soft magnetic materials that can be employed for the leading-edge plate 207 include nickel-iron alloys, soft ferrites, and nickel-iron-chromium alloys. The leading-edge plate 207 can have a planar top surface, which is subsequently employed to form a main pole and additional structures thereupon.

A seed layer 218 can be deposited on the top surface of the leading-edge plate 207, for example, by sputtering or vacuum evaporation. The seed layer 218 may, or may not, be magnetic. The seed layer 218 includes a material that can function as a plating seed material (e.g., nucleation material) during a subsequent plating process. In one embodiment, the seed layer 218 can include, and/or consist essentially of, chromium. The thickness of the seed layer 218 can be in a range from 0.5 nm to 5 nm, although lesser and greater thicknesses can also be employed.

A photoresist layer 267 can be applied over the seed layer 218, and can be lithographically patterned to form an opening therein. The opening in the photoresist layer 267 can be formed in a shape of a side shield to be subsequently formed. For example, the periphery of the opening in the photoresist layer 267 can include a straight sidewall 36 that is perpendicular to a top surface of the leading-edge plate 207 and is formed at, or in proximity to, an air bearing surface (ABS) to be subsequently formed. The straight sidewall 36 is parallel to the ABS. The photoresist layer 267 also includes a first throat height sidewall 31 that is parallel to the straight sidewall 36 and to the ABS, and is laterally offset from the straight sidewall by a first lateral distance X, and a pair of second throat height sidewalls 32 that are parallel to the straight sidewall 36 and to the ABS, and are laterally offset from the straight sidewall 36 by a second lateral distance Y that is greater than the first lateral distance X.

The photoresist layer 267 also includes a pair of connection sidewalls 33 that connect a respective edge of the first throat height sidewall 31 to a respective one of the pair of second throat height sidewalls 32. The connection sidewalls 33 extend diagonally (i.e., at an angle of greater than zero and less than 90 degrees) with respect to the straight sidewall 36 and to the ABS. In one embodiment, each connection sidewall 33 and the first throat height sidewall 31 can be adjoined at a respective edge at an angle, which is herein referred to as a taper angle γ. The taper angle γ can be in a range from 20 degrees to 70 degrees, such as from 30 degrees to 60 degrees, although lesser and greater angles can also be employed. Each connection sidewall 33 is also inclined with respect to the ABS by the taper angle γ. In one embodiment, a lateral distance between the pair of connection sidewalls 33 along a direction parallel to the straight sidewall 36 (i.e., parallel to the ABS) increases with a distance from the straight sidewall 36 and from the ABS (as measured along the horizontal direction perpendicular to the straight sidewall 36, i.e., along the direction of the cross-sectional plane D-D').

The photoresist layer 267 also includes a pair of widthwise sidewalls 35 that connect a respective edge of the straight sidewall 36 to an edge of a respective one of the pair of second throat height sidewalls 32. The widthwise sidewalls extend perpendicular to the ABS. In one embodiment, each sidewall segment of the opening in the photoresist layer 267 can be straight sidewalls.

Referring to FIGS. 7A-7D, a sacrificial mold structure 248 can be formed in the patterned photoresist layer 267 employing a deposition process that deposits a sacrificial mold material only within the area of the opening 268 in the patterned photoresist layer 267. Specifically, the sacrificial mold structure 248 can be formed by plating a conductive material on the physically exposed surface of the seed layer 218 within the opening 268 in the patterned photoresist layer 267 over the leading-edge plate 207. For example, the plated conductive material of the sacrificial mold structure 248 can include a nickel-iron alloy, a nickel-phosphorus alloy, copper, or a copper-containing alloy. The thickness of the sacrificial mold structure 248 is selected to be about the maximum thickness of a main pole 220 to be subsequently formed. For example, the thickness of the sacrificial mold structure 248 can be in a range from 100 nm to 2,000 nm, such as from 200 nm to 1,000 nm, although lesser and greater thicknesses can also be employed.

The sacrificial mold structure 248 replicates the shape of the opening 268 in the photoresist layer 267. As such, the sacrificial mold structure 248 can be formed in a shape of a side shield to be subsequently formed. For example, the sidewalls of the sacrificial mold structure 248 can include a straight sidewall 46 that is perpendicular to a top surface of the leading-edge plate 207 and is formed at, or in proximity to, an air bearing surface (ABS) to be subsequently formed, a first throat height sidewall 41 that is parallel to the straight sidewall 46 and to the ABS, is laterally offset from the straight sidewall by a first lateral distance X, and a pair of second throat height sidewalls 42 that are parallel to the straight sidewall 46 and to the ABS, and are laterally offset from the straight sidewall 46 by a second lateral distance Y that is greater than the first lateral distance X.

The sacrificial mold structure 248 also includes a pair of connection sidewalls 43 that connect a respective edge of the first throat height sidewall 41 to a respective one of the pair of second throat height sidewalls 42. The connection sidewalls 43 extend diagonally (i.e., at an angle of greater than zero and less than 90 degrees) with respect to the straight sidewall 46 and to the ABS. In one embodiment, each connection sidewall 43 and the first throat height sidewall 41 can be adjoined at a respective edge at an angle, which is herein referred to as a taper angle γ. The taper angle γ can be in a range from 20 degrees to 70 degrees, such as from 30 degrees to 60 degrees, although lesser and greater angles can also be employed. Each connection sidewall 43 is also inclined with respect to the ABS by the taper angle γ. In one embodiment, a lateral distance between the pair of connection sidewalls 43 along a direction parallel to the straight sidewall 46 increases with a distance from the straight sidewall 46 (as measured along the horizontal direction perpendicular to the straight sidewall 46, i.e., along the direction of the cross-sectional plane D-D').

The sacrificial mold structure 248 also includes a pair of widthwise sidewalls 45 that connect a respective edge of the straight sidewall 46 to an edge of a respective one of the pair of second throat height sidewalls 42. The widthwise sidewalls 45 are perpendicular to the ABS. In one embodiment, each sidewall segment of the sacrificial mold structure 248 can be straight sidewalls. In one embodiment, the first lateral distance X can be in a range from 20 nm to 100 nm, the second lateral distance Y can be in a range from 100 nm to 800 nm.

Referring to FIGS. 8A-8D, the patterned photoresist layer 267 can be removed, for example, by ashing. Portions of the seed layer 218 that are not covered by the sacrificial mold structure 248 are removed, for example, by ion milling. Top surfaces of the leading-edge plate 207 can be physically exposed in areas that are not covered by the sacrificial mold structure 248.

Referring to FIGS. 9A-9D, a conformal dielectric spacer layer 225 can be formed on the physically exposed surfaces of the sacrificial mold structure 248 and the leading-edge plate 207. The conformal dielectric spacer layer 225 includes a dielectric material such as silicon oxide, and can be deposited by a conformal deposition process such as a low pressure chemical vapor deposition (LPCVD) process. For example, the conformal dielectric spacer layer 225 can be deposited by thermal decomposition of tetraethylorthosilicate (TEOS) into silicon oxide in an LPCVD process. In one embodiment, the conformal dielectric spacer layer 225 comprises, and/or consists essentially of, silicon oxide such as TEOS oxide (i.e., silicon oxide formed by thermal decomposition of TEOS). The thickness of the conformal dielectric spacer layer 225 can be in a range from 1 nm to 10 nm, such as from 2 nm to 5 nm, although lesser and greater thicknesses can also be employed.

Referring to FIGS. 10A-10D, a non-magnetic gap material is deposited over the conformal dielectric spacer layer 225 to form a continuous non-magnetic gap material layer 215L. The non-magnetic gap material is a non-magnetic material that provides magnetic isolation in the side gap between a main pole and a side shield of a PRM transducer (i.e., recording head) portion of magnetic head to be subsequently formed. The non-magnetic gap material can be a dielectric material that can be subsequently etched at about the same etch rate as the material of the conformal dielectric spacer layer 225. The non-magnetic gap material can be deposited conformally or non-conformally. In one embodiment, the non-magnetic gap material is a dielectric material different from the dielectric material of the conformal dielectric spacer layer 225. In one embodiment, the non-magnetic gap material is a metal oxide, such as aluminum oxide ($Al_2O_3$), if the conformal dielectric spacer layer 225 includes silicon oxide. The thickness of the continuous non-magnetic gap material layer 215L, as measured in a planar region outside the area of the sacrificial mold structure 248, can be greater than the thickness of the sacrificial mold structure 248.

Referring to FIGS. 11A-11D, the non-magnetic gap material of the continuous non-magnetic gap material layer 215L can be planarized employing the sacrificial mold structure 248 as a planarization stopping structure. For example, a chemical mechanical planarization (CMP) process can be performed to remove the portions of the continuous non-magnetic gap material layer 215L from above a horizontal plane including the top surface of the sacrificial mold structure 248. The metallic material of the sacrificial mold structure 248 can function as an effective planarization stopping material for the CMP process. The remaining portion of the continuous non-magnetic gap material layer 215L constitutes a non-magnetic gap material matrix 215. The portion of the conformal dielectric spacer layer 225 on a planar top surface of the sacrificial mold structure 248 is removed by the CMP process to expose the planar top surface of the sacrificial mold structure 248.

The non-magnetic gap material matrix 215 is formed around the sacrificial mold structure 248 and the conformal dielectric spacer layer 225 portions which remain on the sidewalls of the planar top surface of the sacrificial mold structure 248. The non-magnetic gap material matrix 215 is formed outside an area of the sacrificial mold structure 248 over another remaining portion of the conformal dielectric spacer layer 225. The non-magnetic gap material matrix 215 can be laterally spaced from the sacrificial mold structure 248 by a uniform spacing, which can be the same as the thickness of the conformal dielectric spacer layer 225. In one embodiment, the non-magnetic gap material matrix 215 includes a dielectric material different from the dielectric material of the conformal dielectric spacer layer 225. In one embodiment, the non-magnetic gap material matrix 215 includes aluminum oxide, and the conformal dielectric spacer layer 225 can include silicon oxide.

Referring to FIGS. 12A-12D, the sacrificial mold structure 248 can be removed selective to the materials of the non-magnetic gap material matrix 215 and the conformal dielectric spacer layer 225. As used herein, a first material is removed "selective to" a second material if the process employed to remove the first material provides a removal rate for the first material that is at least three times, such as ten or more times, the removal rate for the second material. Thus, an etch process that removes a first material selective to a second material provides a selectivity greater than 3, and typically a selectivity greater than 10.

The selective removal of the sacrificial mold structure 248 without, or with minimal, collateral removal of the materials of the non-magnetic gap material matrix 215 and the conformal dielectric spacer layer 225 can be provided by a wet etch process. For example, a wet etch solution including a mixture of nitric acid, acetic acid, acetone, hydrofluoric acid, sulfuric acid, phosphoric acid, and/or water can be employed to etch the sacrificial mold structure 248 selective to the materials of the seed layer 218, the non-magnetic gap material matrix 215 and the conformal dielectric spacer layer 225 (which may include aluminum oxide and silicon oxide). A cavity 239 can be formed in the volume from which the sacrificial mold structure 248 is removed. A top surface of the seed layer 218 can be physically exposed at the bottom of the cavity 239.

Figure 13D:
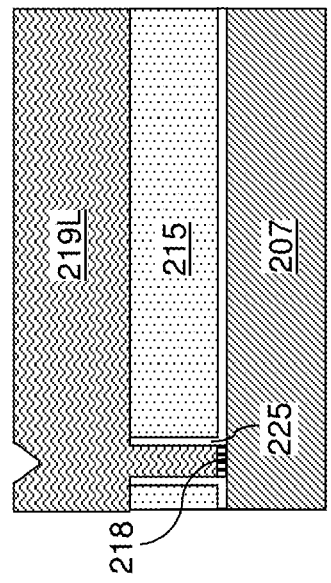
FIGS. 13B, 13C, and 13D are vertical cross-sectional views of the exemplary structure along the vertical planes B-B', C-C', and D-D' of FIG. 13A, respectively.
Figure 13C:
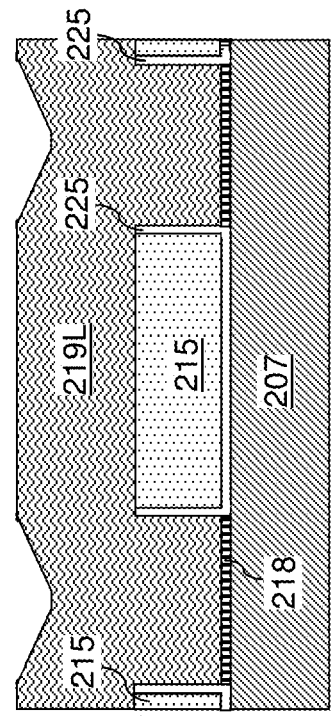
Figure 13A:
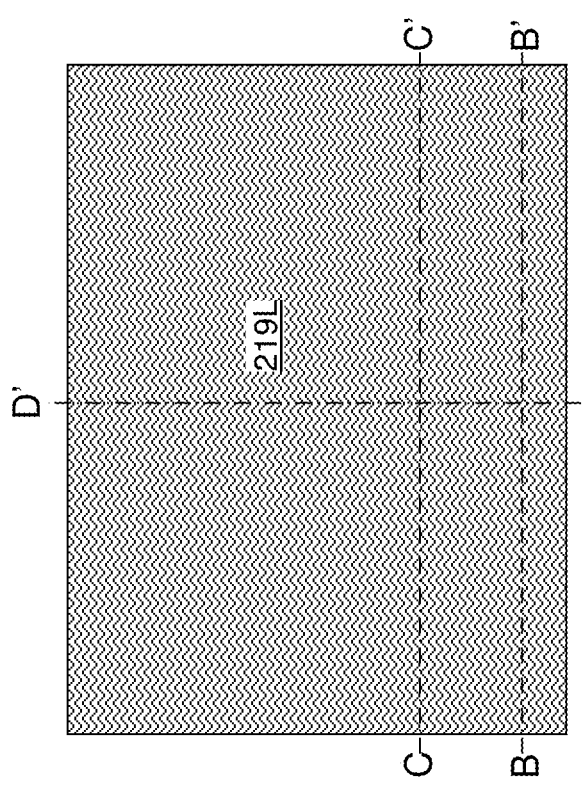
FIG. 13A is a top-down view of an exemplary structure after deposition of a template material layer according to an embodiment of the present disclosure.
Figure 13B:
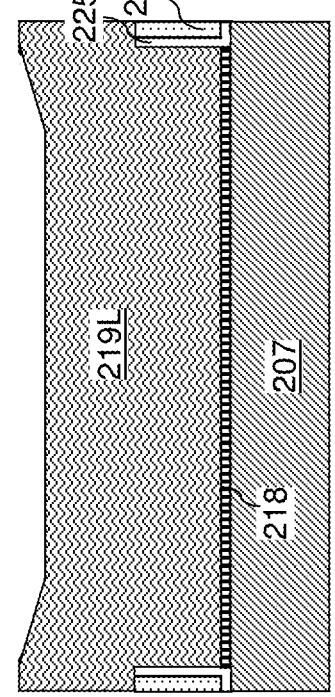
Figure 17D:
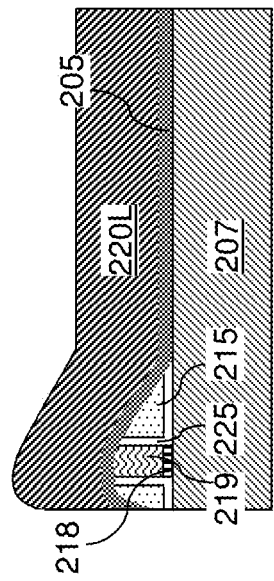
FIGS. 17B, 17C, and 17D are vertical cross-sectional views of the exemplary structure along the vertical planes B-B', C-C', and D-D' of FIG. 17A, respectively.
Figure 17A:
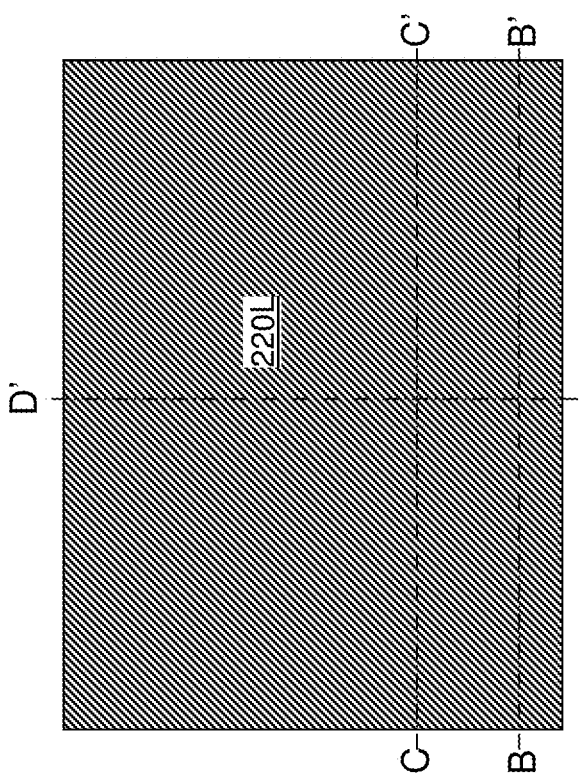
FIG. 17A is a top-down view of an exemplary structure after deposition of a non-magnetic gap material layer and a main pole material layer according to an embodiment of the present disclosure.
Figure 17C:
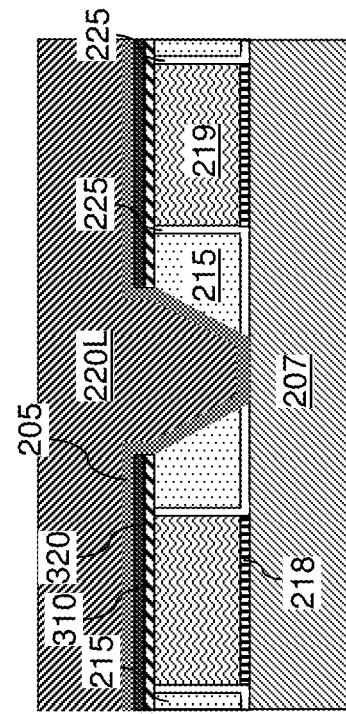
Figure 17B:
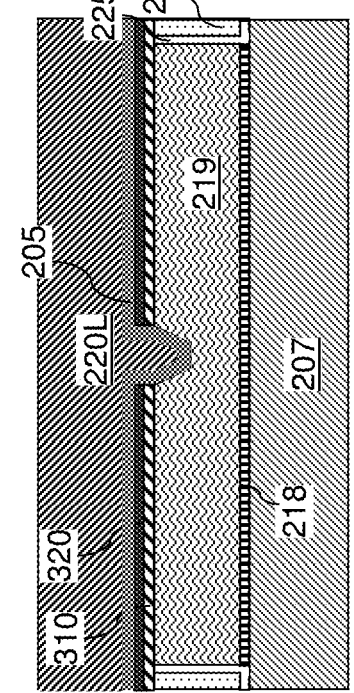
Figure 19D:
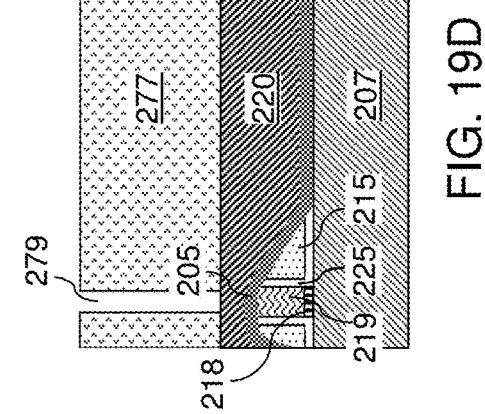
FIGS. 19B, 19C, and 19D are vertical cross-sectional views of the exemplary structure along the vertical planes B-B', C-C', and D-D' of FIG. 19A, respectively.
Figure 19A:
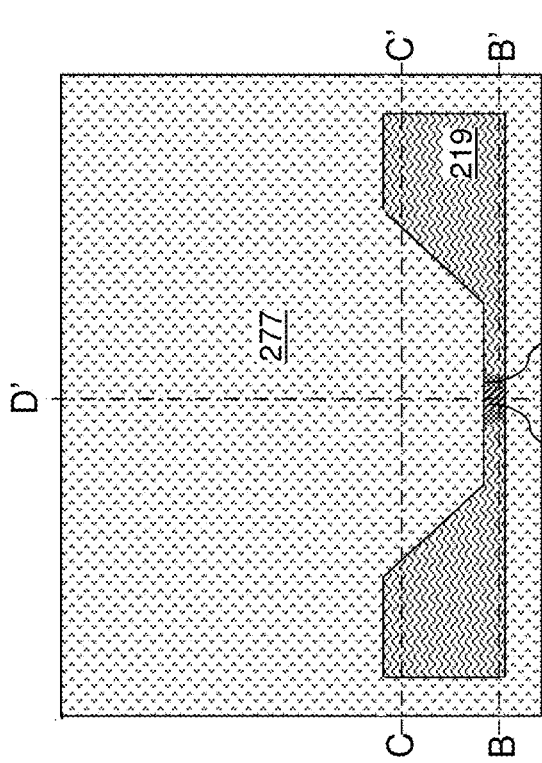
FIG. 19A is a top-down view of an exemplary structure after formation of a patterned etch mask layer according to an embodiment of the present disclosure.
Figure 19C:
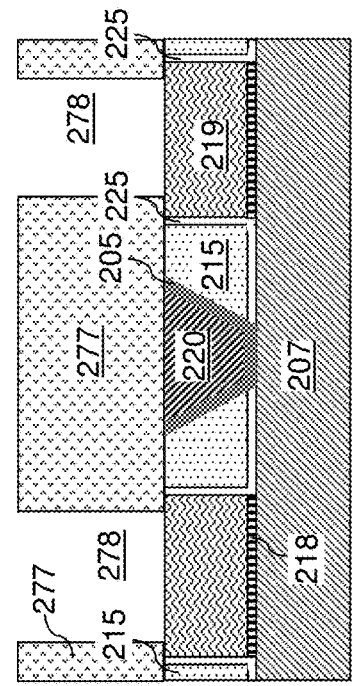
Figure 19B:
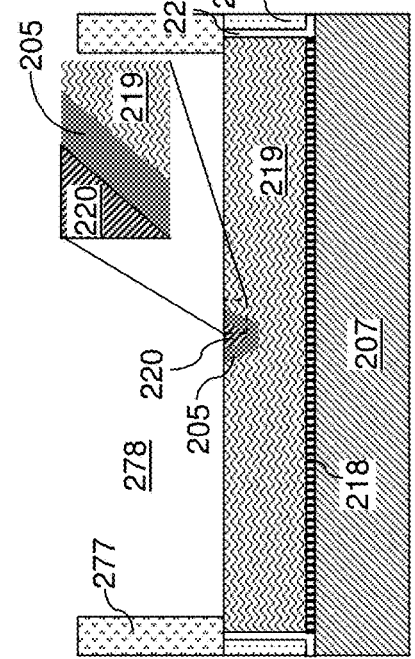
Figure 21D:
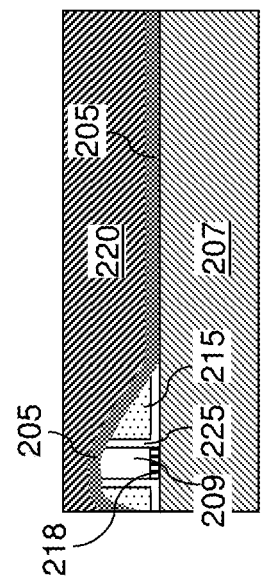
FIGS. 21B, 21C, and 21D are vertical cross-sectional views of the exemplary structure along the vertical planes B-B', C-C', and D-D' of FIG. 21A, respectively.
Figure 21C:
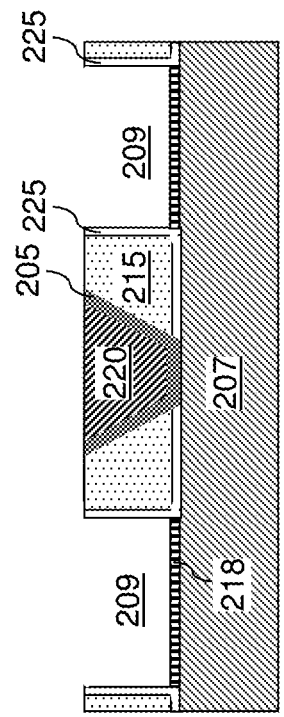
Figure 21A:
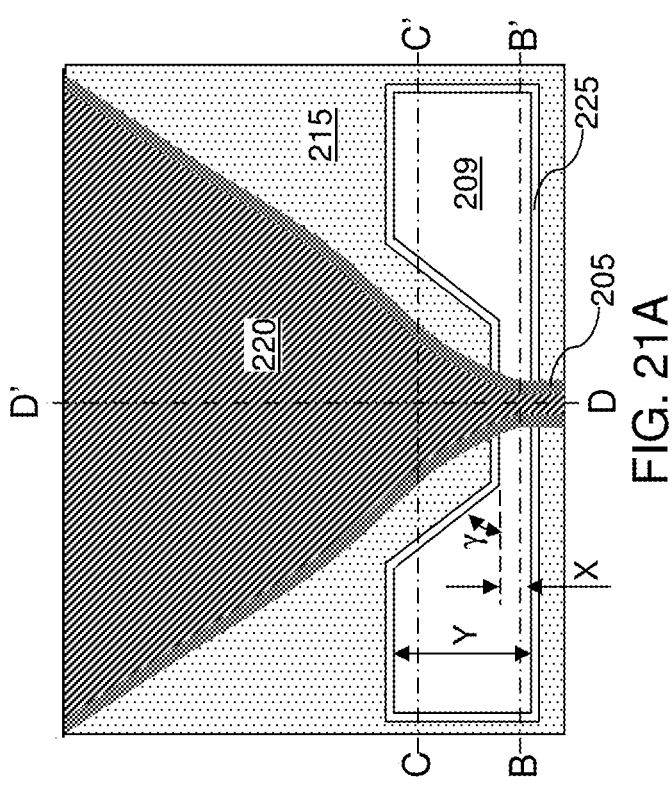
FIG. 21A is a top-down view of an exemplary structure after removal of the patterned etch mask layer according to an embodiment of the present disclosure.
Figure 21B:
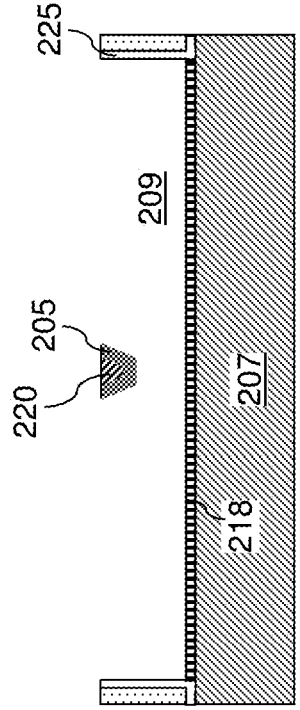
Figure 22A:
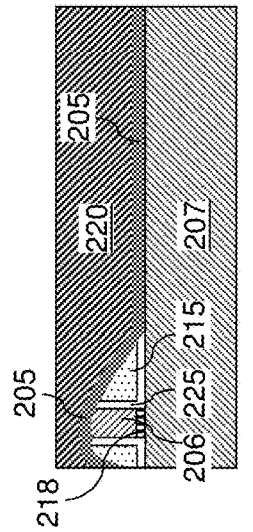
FIG. 22A is a top-down view of an exemplary structure after formation of a side shield according to an embodiment of the present disclosure.
Figure 22B:
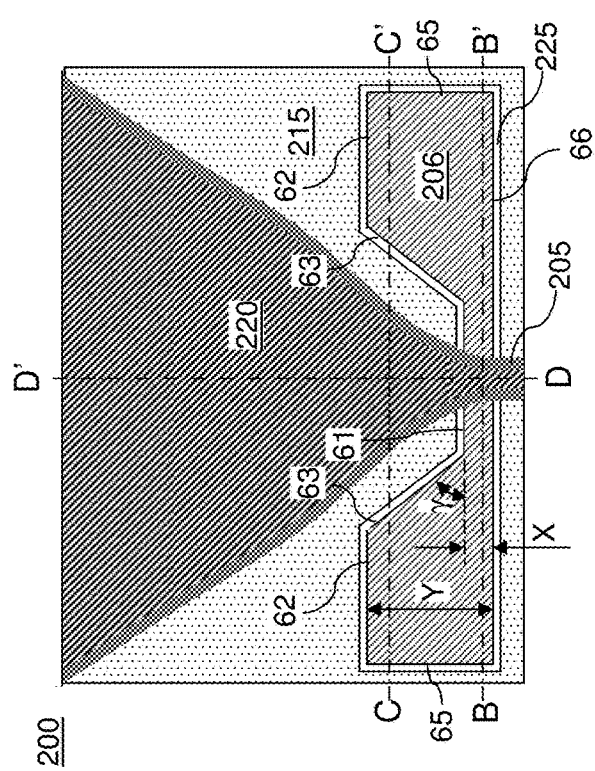
FIGS. 22B, 22C, and 22D are vertical cross-sectional views of the exemplary structure along the vertical planes B-B', C-C', and D-D' of FIG. 22A, respectively.
Figure 22C:
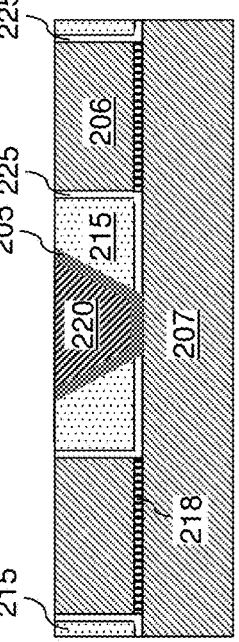
Figure 22D:
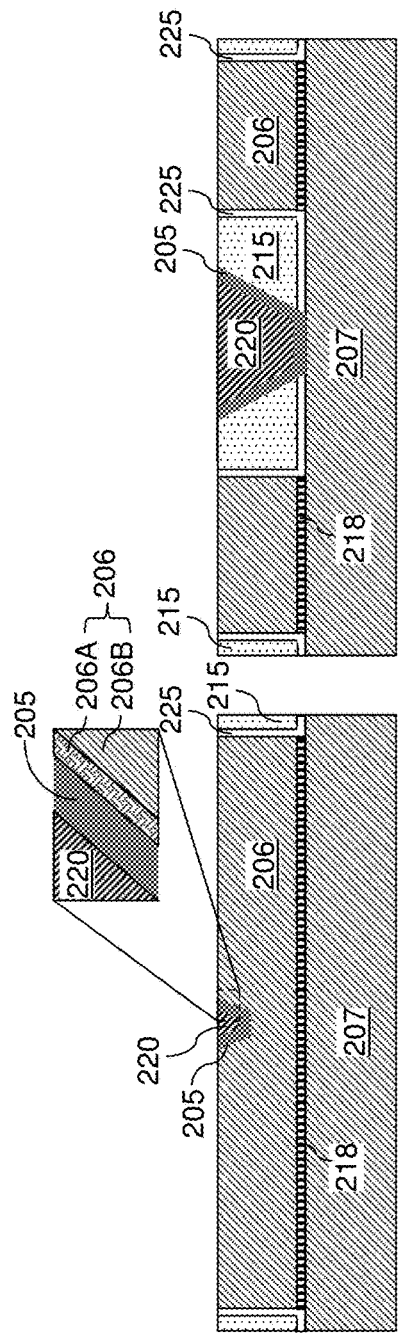

Referring to FIGS. 13A-13C, a template material layer 219L can be deposited in the cavity 239. The template material layer 219L includes a material that can be isotropically etched selective to the material of the conformal dielectric spacer layer 225 and can be patterned by ion scanning at the same removal rate, or at about the same removal rate, as the removal rate of the non-magnetic gap material matrix 215. In one embodiment, the template material layer 219L can include the same dielectric material as the non-magnetic gap material matrix 215. In one embodiment, the conformal dielectric spacer layer 225 comprises, and/or consists essentially of, silicon oxide, the non-magnetic gap material matrix 215 comprises, and/or consists essentially of, aluminum oxide, and the template material layer 219L comprises, and/or consists essentially of, aluminum oxide. The template material layer 219L can completely fill the volume of the cavity 239.

Referring to FIGS. 14A-14D, the template material of the template material layer 219L can be planarized to remove portions of the template material from above the horizontal plane including the top surface of the non-magnetic gap material matrix 215. The planarization process can employ chemical mechanical planarization, ion scan, or a combination thereof. The ion scan process can reduce any non-uniformity in the height of the top surface of the planarized template material by directing an ion beam to locations that require removal of more material. A remaining portion of the template material filling the cavity 239 (which is laterally surrounded by sidewall portions of the conformal dielectric spacer layer 225) constitutes a side shield template structure 219, which replicates the shape of the cavity 239. In one embodiment, the side shield template structure 219 comprises, and/or consists essentially of, aluminum oxide.

The side shield template structure 219 replicates the shape of the sacrificial mold structure 248. As such, the side shield template structure 219 can be formed in a shape of a side shield to be subsequently formed. For example, the sidewalls of the side shield template structure 219 can include a straight sidewall 56 that is perpendicular to a top surface of the leading-edge plate 207 and is formed at, or in proximity to, and parallel to an air bearing surface (ABS) to be subsequently formed. The side shield template structure 219 can also include a first throat height sidewall 51 that is parallel to the straight sidewall 56 and to the ABS, and is laterally offset from the straight sidewall by a first lateral distance X, and a pair of second throat height sidewalls 52 that are parallel to the straight sidewall 56 and to the ABS, and are laterally offset from the straight sidewall 56 by a second lateral distance Y that is greater than the first lateral distance X.

The side shield template structure 219 can also include a pair of connection sidewalls 53 that connect a respective edge of the first throat height sidewall 51 to a respective one of the pair of second throat height sidewalls 52. The connection sidewalls 53 extend diagonally (i.e., at an angle of greater than zero and less than 90 degrees) with respect to the straight sidewall 56 and to the ABS. In one embodiment, each connection sidewall 53 and the first throat height sidewall 51 can be adjoined at a respective edge at an angle, which is herein referred to as a taper angle γ. The taper angle γ can be in a range from 20 degrees to 70 degrees, such as from 30 degrees to 60 degrees, although lesser and greater angles can also be employed. Each connection sidewall 53 is also inclined with respect to the ABS by the taper angle γ. In one embodiment, a lateral distance between the pair of connection sidewalls along a direction parallel to the straight sidewall increases with a distance from the straight sidewall 56 (as measured along the horizontal direction perpendicular to the straight sidewall 56, i.e., along the direction of the cross-sectional plane D-D').

The side shield template structure 219 can also include a pair of widthwise sidewalls 55 that connect a respective edge of the straight sidewall 56 to an edge of a respective one of the pair of second throat height sidewalls 52. The widthwise sidewalls 55 can be perpendicular to the ABS. In one embodiment, each sidewall segment of the side shield template structure 219 can be straight sidewalls.

Referring to FIGS. 15A-15D, a blanket metal layer 310 and a metallic etch mask layer 320 can be sequentially deposited as blanket (unpatterned) material layers. The blanket metal layer 310 can be formed on top surfaces of the non-magnetic gap material matrix 215, the conformal dielectric spacer layer 225, and the side shield template structure 219. The blanket metal layer 310 includes a metal that promotes adhesion of the metallic etch mask layer 320. For example, the blanket metal layer 310 can include a transition metal such as tantalum. The blanket metal layer 310 can be deposited by chemical vapor deposition, physical vapor deposition (i.e., sputtering), and/or vacuum evaporation. The thickness of the blanket metal layer 310 can be in a range from 0.5 nm to 10 nm, such as from 1 nm to 5 nm, although lesser and greater thicknesses can also be employed.

The metallic etch mask layer 320 includes a metallic material that can function as an etch mask material during a subsequent ion milling process that patterns a main pole recess region (in which a main pole is to be formed). For example, the metallic etch mask layer 320 can include a metallic material such as ruthenium. The thickness of the metallic etch mask layer 320 can be in a range from 5 nm to 50 nm, although lesser and greater thicknesses can also be employed.

A photoresist material can be applied over the horizontal surface of the metallic etch mask layer 320, and can be lithographically patterned to provide a patterned photoresist layer 327 that overlies a region in which a main pole recess region is to be subsequently formed. The area of the patterned photoresist layer 327 corresponds to an area in which a main pole and a magnetic gap material layer are to be subsequently formed. The patterned photoresist layer 327 extends over a center region of the side shield template structure 219 including the straight sidewall 56 and the first throat height sidewall 51 of the side shield template structure 219, and does not extend over the second throat height sidewalls 52, the connection sidewalls 53, or the widthwise sidewalls 55. The patterned photoresist layer 327 can have a variable width along the direction parallel to the straight sidewall 56 of the side shield template structure 219 and to the ABS, such that the width of the patterned photoresist layer 327 increases with a lateral distance from the straight sidewall 56 along a horizontal direction that is perpendicular to the straight sidewall 56. In one embodiment, the patterned photoresist layer 327 can have a plane of mirror symmetry about a plane that is perpendicular to the straight sidewall 56 of the side shield template structure 219 and to the ABS. The plane of mirror symmetry can be, for example, the plane of the vertical cross-sectional view of FIG. 15D, i.e., the plane D-D' of FIG. 15A.

A sacrificial metal layer 330 can be deposited over the blanket metal layer 310 and the patterned photoresist layer 327. The sacrificial metal layer 330 includes a metal that is different from the material of the metallic etch mask layer 320. The sacrificial metal layer 330 can be deposited by an anisotropic deposition process (such as vacuum evaporation of sputtering) or by an isotropic deposition process (such as chemical vapor deposition). In one embodiment, the sacrificial metal layer 330 can include a transition metal such as tantalum. In one embodiment, the sacrificial metal layer 330 includes the same metal as the blanket metal layer 310. The thickness of the horizontal portions of the sacrificial metal layer 330 can be in a range from 0.5 nm to 10 nm, such as from 1 nm to 5 nm, although lesser and greater thicknesses can also be employed.

Referring to FIGS. 16A-16D, the sacrificial metal layer 330 can be patterned to remove portions of the sacrificial metal layer 330 that are in contact with the patterned photoresist layer 327. For example, a side milling process can be performed to remove vertical portions of the sacrificial metal layer 330 that are present on the sidewalls of the patterned photoresist layer 327. The duration and the angle of the side milling process can be selected to minimize damage to horizontal portions of the sacrificial metal layer 330. Subsequently, the sacrificial metal layer 330 can be patterned by lifting off the patterned photoresist layer 327 and portions of the sacrificial metal layer 330 overlying the patterned photoresist layer 327. An opening is formed in the remaining portions of the sacrificial metal layer 330 within areas from which the patterned photoresist layer 327 is removed. Thus, the patterned sacrificial metal layer 330 is present only within areas that are outside the area of the patterned photoresist layer 327.

The metallic etch mask layer 320 is patterned by a first etch process that etches unmasked portions of the metallic etch mask layer 320 employing the remaining portions of the sacrificial metal layer 330 as an etch mask. The first etch process etches the material of the metallic etch mask layer 320 selective to the material of the sacrificial metal layer 330. The etch process can include an anisotropic etch process such as a reactive ion etch process or an isotropic etch process such as a wet etch process. For example, a reactive ion etch process employing an oxygen plasma, an ozone plasma, or a plasma of $CH_3OH$ and Ar may be employed.

The blanket metal layer 310 can be subsequently etched to form an opening therethrough within an area that is not covered by the metallic etch mask layer 320. A second etch process may be employed, which employs the patterned metallic etch mask layer 320 as an etch mask. An opening through the blanket metal layer 310 that are not covered by remaining portions of the sacrificial metal layer 330 to provide a patterned metal layer 310'. Any remaining portion of the sacrificial metal layer 330 and an unmasked region of the blanket metal layer 310 can be concurrently etched during the second etch process, to remove all remaining portions of the sacrificial metal layer 330.

Subsequently, a main pole recess region 229 is formed by patterning the non-magnetic gap material matrix 215, the conformal dielectric spacer layer 225, and the side shield template structure 219 employing an anisotropic etch process such as a reactive ion etch process. Specifically, physically exposed portions of the non-magnetic gap material matrix 215, the conformal dielectric spacer layer 225, and the side shield template structure 219 can be etched employing the patterned metallic etch mask layer 320 as an etch mask.

In one embodiment, the anisotropic etch process comprises a reactive ion etch process that etches the material of the side shield template structure 219 with an etch rate that is within a range from 90% to 110% of an etch rate for the material of the non-magnetic gap material matrix 215. For example, an inductively couple plasma (ICP) etch process employing a fluorocarbon-based etchant (such as $CF_4$, $C_4F_6$, and $C_4F_8$) can used be in combination with Ar for the anisotropic etch process. In one embodiment, the side shield template structure 219 can include the same material as the non-magnetic gap material matrix 215. Further, the etch chemistry of the anisotropic etch process can be selected such that the anisotropic etch process etches the material of the conformal dielectric spacer layer 225 with an etch rate that is within a range from 80% to 120% of the etch rate for the material of the non-magnetic gap material matrix 215. In one embodiment, the side shield template structure 219 and the non-magnetic gap material matrix 215 can comprise, and/or consist essentially of, aluminum oxide, and the conformal dielectric spacer layer 225 can comprise, and/or consist essentially of silicon oxide such as TEOS oxide, i.e., a silicon oxide material formed by decomposition of TEOS.

The patterned cavity formed in the combination of the non-magnetic gap material matrix 215, the conformal dielectric spacer layer 225, and the side shield template structure 219 constitutes the main pole recess region 229. The uniform, or near-uniform, etch rates of the materials of the non-magnetic gap material matrix 215, the conformal dielectric spacer layer 225, and the side shield template structure 219 facilitates formation of the main pole recess region 229 with smooth surfaces and without bumps. A top surface of the leading-edge plate 207 and tapered sidewalls of the non-magnetic gap material matrix 215, the conformal dielectric spacer layer 225, and the side shield template structure 219 are physically exposed in the main pole recess region 229. Portions of the side shield template structure 219 that are covered by the metallic etch mask layer 320 are shown in dashed lines in FIG. 16A.

In one embodiment, the lateral extent of the main pole recess region 229 along the direction parallel to the ABS and to the straight sidewall 56 of the side shield template structure 219 increases with a distance from the ABS and from the straight sidewall 56 of the side shield template structure 219. In one embodiment, the main pole recess region 229 can have a mirror symmetry about a symmetry plane (such as the apex vertical plane D-D') that is perpendicular to the ABS and to the straight sidewall 56 and to the top surface of the leading-edge plate 207. In one embodiment, the side shield template structure 219 is recessed within a region proximal to the symmetry plane, and is not recessed within a region that is distal from the symmetry plane during formation of the main pole recess region 229.

In one embodiment, a portion of the top surface of the leading-edge plate 207 is physically exposed within a region that is more distal from the ABS and the straight sidewall 56 of the side shield template structure 219 than the pair of second throat height sidewalls 52 is from the ABS and the straight sidewall 56 of the side shield template structure 219, i.e., in a region farther away from the ABS and the straight sidewall 56 of the side shield template structure 219 than the second lateral distance Y. In one embodiment, the non-magnetic gap material matrix 215 includes a tapered region having a variable thickness that decreases with a distance from the straight sidewall 56 of the side shield template structure 219 between the pair of second throat height sidewalls 52 and the region in which the portion of the top surface of the leading-edge plate 207 is physically exposed. The straight sidewall 56 of the side shield template structure 219, the first throat height sidewall 51 of the side shield template structure 219, and two sidewall portions of the conformal dielectric spacer layer 225 that adjoin the straight sidewall 56 and the first throat height sidewall 51 of the side shield template structure 219 can be recessed to form respective recess regions.

Referring to FIGS. 17A-17D, a non-magnetic gap material layer 205 can be deposited in, and over, the main pole recess region 229 and over the patterned metallic etch mask layer 320 by a conformal deposition process. The non-magnetic gap material layer 205 includes a non-magnetic metallic material that can act as a second plating seed layer, and can be deposited by atomic layer deposition (for example, by decomposition of $RuO_4$ with a hydride gas), physical vapor deposition, or vacuum evaporation. In one embodiment, the non-magnetic gap material layer 205 comprises, and/or consists of, a ruthenium layer having a thickness in a range from 6 nm to 30 nm, such as from 12 nm to 20 nm, although lesser and greater thicknesses can also be employed. The non-magnetic gap material layer 205 includes a material that is different in composition from the conformal dielectric spacer layer 225 and from the non-magnetic gap material matrix 215.

A main pole material layer 220L can be deposited over the non-magnetic gap material layer 205 to fill remaining volumes of the main pole recess region 229. The main pole material layer 220L includes a high magnetic moment soft magnetic material, which is herein referred to as a first soft magnetic material. For example, the main pole material layer 220L can include an iron cobalt alloy, such as 2.4T FeCo containing 58 to 73 atomic percent iron, or FeCoM containing 58 to 73 atomic percent iron, where M comprises one or more of Ni, Ir, Cu or Rh at a concentration of 0.1 to 5 atomic percent. The main pole material layer 220L can be deposited, for example, by plating, such as electroplating on the Ru seed material of layer 205. The thickness of the main pole material layer 220L is selected such that the entire remaining volume of the main pole recess region 229 is filled with the main pole material layer 220L.

Referring to FIGS. 18A-18D, the non-magnetic gap material layer 205 and the main pole material layer 220L can be planarized to remove portions of the non-magnetic gap material layer 205 and the main pole material layer 220L from above a horizontal plane including the top surface of the side shield template structure 219. For example, a chemical mechanical planarization (CMP) process can be employed to remove the patterned metal layer 310, the metallic etch mask layer 320, and portions of the non-magnetic gap material layer 205 and the main pole material layer 220L overlying the horizontal plane including the top surface of the side shield template structure 219. In one embodiment, the patterned metal layer 310 can be employed as a planarization stopping layer during the CMP process, and a touch-up CMP step may be employed to remove the patterned metal layer 310.

The remaining portion of the main pole material layer 220L constitutes a main pole 220, which includes the first soft magnetic material. A remaining portion of the non-magnetic gap material layer 205 is located between the main pole 220 and the combination of the non-magnetic gap material matrix 215, the conformal dielectric spacer layer 225, and the side shield template structure 219. Coplanar top surfaces of the non-magnetic gap material matrix 215, the conformal dielectric spacer layer 225, and the side shield template structure 219 are physically exposed after the CMP process.

Referring to FIGS. 19A-19D, a patterned etch mask layer 277 can be formed with at least one opening (278, 279) overlying the side shield template structure 219. The patterned etch mask layer 277 includes a patterned material portion that can function as an etch mask during a subsequent isotropic etch process that etches the material of the side shield template structure 219. For example, the patterned etch mask layer 277 can be a photoresist layer.

Specifically, the patterned etch mask layer 277 can be formed over the main pole 220, the non-magnetic gap material matrix 215, the conformal dielectric spacer layer 225, and optionally the side shield template structure 219. At least one first opening 278 within the patterned etch mask layer 227 overlies at least a portion of the side shield template structure 219, and does not overly any area of the non-magnetic gap material matrix 215. A optional second opening 279 within the patterned etch mask layer 227 may, or may not, be formed over a portion of the main pole 220 and/or the non-magnetic gap material layer 205 that overlies the side shield template structure 219. In one embodiment, each opening through the patterned etch mask layer 227 is formed outside the area of the non-magnetic gap material matrix 215, and the entire top surface of the non-magnetic gap material matrix 215 is completely covered by the patterned etch mask layer 277. Thus, access to the non-magnetic gap material matrix 215 by an isotropic etchant during a subsequent isotropic etch process is prevented by the patterned etch mask layer 277.

Referring to FIGS. 20A-20D, a side shield cavity 209 can be formed by removal of the side shield template structure 219 selective to the material of the conformal dielectric spacer layer 225. In case any portion of the main pole 220 and/or the non-magnetic gap material layer 205 is not masked by the patterned etch mask layer 277, the chemistry of the isotropic etch process can be selected such that the isotropic etch process removes the material of the side shield template structure 219 with high selectivity (which may be greater than 10 and/or greater than 50) to the materials of the conformal dielectric spacer layer 225, the main pole 220, and/or the non-magnetic gap material layer 205.

In one embodiment, the side shield template structure 219 can comprise, and/or consist essentially of, aluminum oxide, and the conformal dielectric spacer layer 225 can include silicon oxide. In this case, the isotropic etch process comprises a dry etch process using chlorine based chemistry (e.g., $Cl_2$ and $BCl_3$) or wet etch process that etches aluminum oxide selective to silicon oxide. For example, a wet etch process employing a mixture of ammonium hydroxide, hydrogen peroxide, and water or phosphoric acid including chromium oxide ($Cr_2O_3$) may be employed to etch aluminum oxide selective to silicon oxide. In one embodiment, the side shield cavity 209 can underlie a portion of the main pole 220 and the non-magnetic gap material layer 205. In this case, a tip of the main pole 220 can extend over the side shield cavity 209 in a bridge configuration. The tip of the main pole 220 is lined with the non-magnetic gap material layer 205 only on the bottom side, and a top surface of the tip of the main pole 220 is physically exposed. In one embodiment, the non-magnetic gap material layer 205 can contact two opposing segments of a sidewall portion 225S of the conformal dielectric spacer layer 225 that are spaced by the side shield cavity 209 along the direction parallel to the apex plane (D-D') and perpendicular to the ABS plane (B-B'). Removal of the side shield template structure 219 may be selective to the seed layer 218. In this case, the seed layer 218 can be present at the bottom of the side shield cavity 209.

Referring to FIGS. 21A-21D, the patterned etch mask layer 277 can be removed. For example, the patterned etch mask layer 277 may be lifted off in a solvent, or may be removed by ashing.

Referring to FIGS. 22A-22D, a side shield 206 is formed within the side shield cavity 209 by deposition of at least a second soft magnetic material in the side shield cavity 209. In one embodiment, a metallic seed layer 206A (i.e., third plating seed layer) may be optionally deposited in the side shield cavity 209. The metallic seed layer 206A includes a metallic material that can function as a seed material for a subsequent plating process. The metallic seed layer 206A may be deposited by a conformal deposition process (such as chemical mechanical planarization or atomic layer deposition), or may be deposited by a non-conformal deposition process (such as physical vapor deposition or vacuum evaporation). The metallic seed layer 206A can include, for example, ruthenium or chromium. The thickness of the metallic seed layer 206A may be in a range from 0.5 nm to 5 nm, although lesser and greater thicknesses can also be employed. The metallic seed layer 206A can be deposited directly on the physically exposed top surface of the leading-edge plate 207 or directly on the top surface of the first plating seed layer 218. In case the first plating seed layer 218 is present, formation of the metallic seed layer 206A may be omitted.

The second soft magnetic material is deposited to fill the remaining volume of the side shield cavity 209. The second soft magnetic material can be deposited, for example, by plating, such as electroplating, on a plating seed layer (e.g., 206A or 218). The second soft magnetic material can include, for example, a material selected from nickel-iron alloys, soft ferrites, and nickel-iron-chromium alloys, such as 1T $Ni_{0.8}Fe_{0.2}$, 1.6T $Ni_{0.45}Fe_{0.55}$, 1.9T $Ni_{0.13}Fe_{0.18}Co_{0.69}$, 2T $Ni_{0.29}Fe_{71}$, etc. Preferably, the second soft magnetic material has a lower magnetic flux density than magnetic material of the main pole 220. Chemical mechanical planarization process can be performed to remove portions of the second soft magnetic material and the metallic seed layer 206A that are located above the horizontal plane including the top surfaces of the main pole 220 and the non-magnetic gap material matrix 215. The remaining portion of the second soft magnetic material constitutes a side shield soft magnetic material portion 206B. The combination of the metallic seed layer 206A and the side shield soft magnetic material portion 206B fills the side shield cavity 209, and constitutes a side shield 206. Thus, the side shield template structure 219 is replaced with the side shield 206.

The side shield 206 is spaced from the main pole 220 at least by the non-magnetic gap material layer 205. The sidewalls of the side shield 206 can include a straight sidewall 66 that is perpendicular to a top surface of the leading-edge plate 207 and is formed at, or in proximity to, the ABS to be subsequently formed. The straight sidewall is perpendicular to the ABS plane B-B'. The side shield 206 also includes a first throat height sidewall 61 that is parallel to the straight sidewall 66 and is laterally offset from the straight sidewall by a first lateral distance X, a pair of second throat height sidewalls 62 that are parallel to the straight sidewall 46 and are laterally offset from the straight sidewall 66 by a second lateral distance Y that is greater than the first lateral distance X, and a pair of connection sidewalls 63 that connect a respective edge of the first throat height sidewall 61 to a respective one of the pair of second throat height sidewalls 62. The connection sidewalls 33 extend diagonally (i.e., at an angle of greater than zero and less than 90 degrees) with respect to the straight sidewall 36 and to the ABS. In one embodiment, each connection sidewall 63 and the first throat height sidewall 61 can be adjoined at a respective edge at an angle, which is herein referred to as a taper angle γ. The taper angle γ can be in a range from 20 degrees to 70 degrees, such as from 30 degrees to 60 degrees, although lesser and greater angles can also be employed. Each connection sidewall 63 is also inclined with respect to the ABS by the taper angle γ. In one embodiment, a lateral distance between the pair of connection sidewalls along a direction parallel to the straight sidewall increases with a distance from the straight sidewall 66 (as measured along the horizontal direction perpendicular to the straight sidewall 66, i.e., along the direction of the apex cross-sectional plane D-D'). A pair of widthwise sidewalls 65 connect a respective edge of the straight sidewall 66 to an edge of a respective one of the pair of second throat height sidewalls 62. In one embodiment, each sidewall segment of the side shield 206 can be straight sidewalls.

Referring to FIGS. 23A-23C, write gap 150 material (e.g., aluminum oxide or STO layer stack, etc.), portion of the coil 114, return shield 160, and other components of the write transducer 110 shown in FIG. 3 can be deposited and patterned over the exemplary structure of FIGS. 22A-22D. While the write gap 150 material is shown the embodiments of FIGS. 23B and 23C as being formed directly on the main pole 220, and the return shield 160 as shown being formed directly on the write gap 150 materials, if the side shield 206 is formed in a wrap around shield ("WAS") configuration, then the WAS can be located between the write gap 150 materials and the return shield 160 or between the main pole 220 and the write gap 150 material. An air bearing surface can be formed by polishing the return shield 160, the write gap 150 materials, the main pole 220, and a portion of the non-magnetic gap material layer 205 along the ABS plane B-B'. An air bearing surface (ABS) is formed within a plane parallel to the straight sidewall 66 by chemical mechanical planarization. In one embodiment, the ABS can be formed at the straight sidewall 66 of the side shield 206, or within a vertical plane that intersects the side shield 206 and is parallel to the straight sidewall 66 of the side shield 206. A polished surface of the nose of the main pole 220 constitutes a pole tip surface. This step forms an embodiment of a recording head (i.e., write transducer) 200 of the magnetic head (e.g., such as the magnetic head 100 shown in FIG. 3).

The side shield 206 includes a straight sidewall 76 which is located in the ABS, which may, or may not, coincide with the straight sidewall 66 prior to polishing. The first throat height sidewall 61 of the side shield 206 is parallel to the straight sidewall 76 and is laterally offset from the straight sidewall 76 (i.e., from the ABS) by a first throat height X', which may be the same as, or less than, the first lateral distance X. A pair of second throat height sidewalls 62 of the side shield 206 are parallel to the straight sidewall 76 (i.e., to the ABS) and are laterally offset from the straight sidewall 76 (i.e., from the ABS) by a second throat height Y', which may be the same as, or less than, the second lateral distance Y. Edges of a pair of widthwise sidewalls 65 of the side shield 206 are physically exposed to ABS. In one embodiment, each sidewall segment of the side shield 206 can be straight sidewalls. In one embodiment, each connection sidewall 63 and the first throat height sidewall 61 can be adjoined at a respective edge at the taper angle γ, which can be in a range from 20 degrees to 70 degrees, such as from 30 degrees to 60 degrees, although lesser and greater angles can also be employed. Each connection sidewall 63 is provided at the taper angle γ with respect to the ABS. In one embodiment, the first throat height X' can be in a range from 20 nm to 100 nm, the second throat height Y' can be in a range from 100 nm to 800 nm, and the pair of connection sidewalls 63 can have the taper angle with respect to the straight sidewall 76 (i.e., to the ABS) that is in a range from 30 degrees to 60 degrees.

The region of the main pole 220 located between the first throat height sidewall 61 and the straight sidewall 76 (i.e., ABS) is spaced from the side shield 206 by a first side gap G1, which is the thickness of the non-magnetic gap material layer 205. In one embodiment, the width of the first side gap G1 can be in a range from 6 nm to 30 nm, such as from 12 nm to 20 nm, although lesser and greater dimensions can also be employed. The first portion 206a of the side shield 206 adjacent to the first side gap G1 is conformal to the main pole 220. In other words, the width of the first side gap G1 may be uniform between the first portion 206a and the main pole 220. In one embodiment, only the non-magnetic gap material layer 205, such as Ru, is contained in the first side gap G1.

The region of the main pole 220 located between the first throat height sidewall 61 and the second throat height sidewall 62 by a second side gap G2. The second side gap G2 is proximal to the connection sidewalls 63 of the second portion 206b of the side shield 206.

The side shield 206 second portion 206b adjacent to the second side gap G2 can be either conformal or non-conformal to the main pole 220. In other words, the width of the first side gap G1 may be uniform or non-uniform between the second portion 206b and the main pole 220. In one embodiment, the non-magnetic gap material layer 205, such as Ru, the non-magnetic gap material matrix 215, such as aluminum oxide and a conformal dielectric spacer layer 225 having a material (e.g., silicon oxide) different from that of the matrix 215 are contained in the second side gap G2. The uniform value or the average value of the second side gap G2 thickness can be in a range from 20 nm to 200 nm, such as from 40 nm to 100 nm, although lesser and greater dimensions can also be employed.

The first side gap G1 is located between the ABS 76 and the second side gap G2. The first portion 206a of the side shield 206 is located between the second portion 206b of the side shield 206 and the ABS 76.

The first side gap G1 is provided between the ABS and the first throat height X', and is conformal to the main pole 220 nose profile. The first side gap G1 can be uniform throughout, and can be the same as the thickness of the non-magnetic gap material layer 205. The second side gap G2 is provided in the region defined by the first throat height X' and the second throat height Y', i.e., the region that is more distal from the ABS than the first throat height X' and less distal from the ABS than the second throat height Y'. The sidewalls of the side shield 206 that define the second side gap G1 may be conformal, or non-conformal, to the nose profile of the main pole 220. In one embodiment, the second side gap G2 may have a uniform spacing throughout, and the nose profile of the main pole 220 may be parallel to the connection sidewalls 63 of the side shield 206. In another embodiment, the second side gap G2 may have a non-uniform profile, and the second side gap may be non-uniform. The second side gap may increase in width, or decrease in width, with a distance from the ABS. The second throat height Y' may be comparable with a throat height in conventional PMR writers.

According to one embodiment, a magnetic recording head 200 having air bearing surface (ABS) 76 includes a main pole 220, a side shield 206 laterally spaced from the main pole 220 by a first side gap G1 and a second side gap G2, an electrically conductive non-magnetic gap material layer 205 disposed between the main pole 220 and the side shield 206 in the first side gap G1, and a dielectric non-magnetic gap material matrix 215 and a conformal dielectric spacer layer 225 disposed between the main pole 220 and the side shield 206 in the second side gap G2.

In one embodiment, the conformal dielectric spacer layer 225 comprises a material that is different in composition from the electrically conductive non-magnetic gap material layer 205 and from the dielectric non-magnetic gap material matrix 215. For example, the conformal dielectric spacer layer 225 comprises silicon oxide, the electrically conductive non-magnetic gap material layer 205 comprises ruthenium, and the dielectric non-magnetic gap material matrix 215 comprises aluminum oxide.

In one embodiment, the first side gap G1 is located between the ABS 76 and the second side gap G2, a first portion 206a of the side shield 206 is located between a second portion 206b of the side shield 206 and the ABS 76, the first side gap G1 is located between the main pole 220 and the first portion 206a of the side shield 206, and the second side gap G2 is located between the main pole 220 and the second portion 206b of the side shield 206. The first side gap G1 and the first portion 206a of the side shield 206 are located between the ABS 76 and a first throat height X' from the ABS 76, and the second side gap G2 and the second portion 206b of the side shield 206 are located between the first throat height X' and a second throat height Y' from the ABS 76, where the second throat height Y' is greater than the first throat height X'.

In one embodiment, the first portion 206a of the side shield 206 is conformal to the main pole 220, and the second portion 206b of the side shield 206 is either conformal or non-conformal to the main pole 220. In one embodiment, the side shield 206 further comprises a straight first throat height sidewall 61 that is parallel to the ABS 76 and is laterally offset from the ABS 76 by the first throat height X'. The first throat height sidewall 61 is located between the first portion 206a and the second portion 206b of the side shield 206. The side shield further comprises a pair of second throat height sidewalls 62 that are parallel to the ABS 76 and are laterally offset from the ABS 76 by the second throat height Y', a pair of widthwise sidewalls 65 that extend perpendicular to the ABS 76 and which are physically exposed in the ABS 76 and connection sidewalls 63 which connect the first throat height sidewall 61 to the pair of second throat height sidewalls 62. The connection sidewalls 63 are adjoined to the first throat height sidewall 61 at a respective edge at an angle in a range from 20 degrees to 70 degrees. The second side gap G2 is located between the connection sidewalls 63 and the main pole 220.

In one embodiment, only the electrically conductive non-magnetic gap material layer 205 is located in the first side gap G1. In contrast, the electrically conductive non-magnetic gap material layer 205, the conformal dielectric spacer layer 225 and the dielectric non-magnetic gap material matrix 215 are located in the second side gap G2. The electrically conductive non-magnetic gap material layer 205 is located adjacent to the main pole 220 in the first side gap G1 and in the second side gap G2. The conformal dielectric spacer layer 225 is located adjacent to the side shield 206 in the second gap G2. The dielectric non-magnetic gap material matrix 215 is located between the electrically conductive non-magnetic gap material layer 205 and the conformal dielectric spacer layer 225 in the second side gap G2.

In one embodiment, the magnetic recording head 200 also includes a leading-edge plate 207 located on a side of the main pole 220 and having a planar interface with a planar portion 225P of the conformal dielectric spacer layer 225 within a two-dimensional plane that is perpendicular to the ABS 76, a seed layer 218 located between the side shield 206 and the leading-edge plate 207, and having an extent that is bounded by the conformal dielectric spacer layer 225 and the ABS 76. The conformal dielectric spacer layer 225 further comprises a sidewall portion 225S that extends along directions that are perpendicular to the planar interface between the leading-edge plate 207 and the planar portion 225P of the conformal dielectric spacer layer 225. The conformal dielectric spacer layer contains a recess region 229 through which the non-magnetic gap material layer 205 and the main pole 220 extend toward the ABS 76.

According to another embodiment, a magnetic recording head having air bearing surface (ABS) 76 includes a main pole 220, and a side shield 206 laterally spaced from the main pole 220 by a first side gap G and a second side gap G2. A first portion 206a of the side shield 206 is located between a second portion 206b of the side shield 206 and the ABS 76. A straight first throat height sidewall 61 of the side shield 206 is parallel to the ABS 76 and is laterally offset from the ABS 76 by a first throat height X'. The first throat height sidewall 61 is located between the first portion 206a and the second portion 206b of the side shield 206. A pair of second throat height sidewalls 62 of the side shield 206 are parallel to the ABS 76 and are laterally offset from the ABS 76 by a second throat height Y' which is greater than the first throat height X'.

The various methods of the embodiments of the present disclosure provide a method of manufacturing dual side gap perpendicular magnetic recording (PMR) writer (i.e., recording head). The PMR writer is shielded by the side shield 206 and the return shield 160, and includes dual side gaps (G1, G2) between the ABS and the second throat height Y'. The dual side gap design for the PMR writer provides reduced adjacent track interference (ATI) field and improved side field gradient (or track edge curvature) relative to PMR writers employing a non-conformal side shield design, thereby providing high track density magnetic recording. By using a pre-defined side shield shape and a replacement process for formation of the side shield 206, the embodiment process eliminates non-uniform side shield magnetic property of prior art recording heads.

The embodiment recording head also provides improved WATER reliability compared to the prior art recording heads having non-conformal side gaps. Additionally, the dual side gap design of the embodiments of the present disclosure provides a narrow first side gap G1 region with a smaller first throat height than in prior art devices. The reverse overwrite ("ReOVW") can be improved by narrow first side gap G1, thus providing high track density and areal density magnetic recording.

Thus, the dual side gap recording head (e.g., PMR writer) 200 of the embodiments of the present disclosure can improve on track performance on write gap peak field, on track performance on write field gradient, ATI off track performance, WATER reliability and can provide advantageous writer and side shield saturation properties.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A magnetic recording head having an air bearing surface (ABS), comprising:
    a main pole;
    a side shield laterally spaced from the main pole by a first side gap and a second side gap;
    an electrically conductive non-magnetic gap material layer;
    a dielectric layer; and
    a dielectric non-magnetic gap material matrix disposed between the main pole and a second portion of the side shield in the second side gap;
    wherein:
    a first portion of the side shield is located between the second portion of the side shield and the ABS;
    a straight first throat height sidewall of the side shield is parallel to the ABS and is laterally offset from the ABS by a first throat height;
    the first throat height sidewall is located between the first and the second portions of the side shield;
    a pair of second throat height sidewalls of the side shield are parallel to the ABS and are laterally offset from the ABS by a second throat height which is greater than the first throat height;
    only the electrically conductive non-magnetic gap material layer is located in the first side gap between the main pole and the first portion of the side shield; and
    the electrically conductive non-magnetic gap material layer and the dielectric layer are located in the second side gap between the main pole and the second portion of the side shield; and
    the dielectric layer comprises a conformal dielectric spacer layer that comprises a material that is different in composition from the dielectric non-magnetic gap material matrix.

2. The magnetic recording head of claim 1, wherein:
    the conformal dielectric spacer layer comprises silicon oxide; and
    the dielectric non-magnetic gap material matrix comprises aluminum oxide.

3. The magnetic recording head of claim 1, wherein:
    the conformal dielectric spacer layer is located adjacent to the side shield in the second side gap; and
    the dielectric non-magnetic gap material matrix is located between the conformal dielectric spacer and the electrically conductive non-magnetic gap material layer in the second side gap.

4. The magnetic recording head of claim 3, further comprising:
    a leading-edge plate located on a side of the main pole and having a planar interface with a planar portion of the conformal dielectric spacer layer within a two-dimensional plane that is perpendicular to the ABS; and
    a seed layer located between the side shield and the leading-edge plate, and having an extent that is bounded by the conformal dielectric spacer layer and the ABS,
    wherein the conformal dielectric spacer layer further comprises a sidewall portion that extends along directions that are perpendicular to the planar interface between the leading-edge plate and the planar portion of the conformal dielectric spacer layer, and wherein the conformal dielectric spacer layer contains a recess region through which the electrically conductive non-magnetic gap material layer and the main pole extend toward the ABS.

* * * * *